(12) United States Patent
Kim et al.

(10) Patent No.: US 10,089,130 B2
(45) Date of Patent: Oct. 2, 2018

(54) VIRTUAL DESKTOP SERVICE APPARATUS AND METHOD

(71) Applicant: Electronics and Telecommunications Research Institute, Daejeon (KR)

(72) Inventors: Dae Won Kim, Daejeon (KR); Myeong Hoon Oh, Daejeon (KR); Sun Wook Kim, Hwaswong-si (KR); Seong Woon Kim, Gyeryong-si (KR); Jong Bae Moon, Daejeon (KR); Soo Cheol Oh, Daejeon (KR); Jung Hyun Cho, Daejeon (KR); Hag Young Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 86 days.

(21) Appl. No.: 14/463,190

(22) Filed: Aug. 19, 2014

(65) Prior Publication Data

US 2015/0113528 A1 Apr. 23, 2015

(30) Foreign Application Priority Data

Oct. 21, 2013 (KR) ........................ 10-2013-0125207

(51) Int. Cl.
*G06F 9/455* (2018.01)
*G06F 9/451* (2018.01)

(52) U.S. Cl.
CPC .......... *G06F 9/45558* (2013.01); *G06F 9/452* (2018.02)

(58) Field of Classification Search
CPC ......................... G06F 9/45533; G06F 9/5088
See application file for complete search history.

(56) References Cited

U.S. PATENT DOCUMENTS

| | | | |
|---|---|---|---|
| 7,912,955 B1* | 3/2011 | Machiraju | G06F 9/5077 709/221 |
| 2007/0180448 A1* | 8/2007 | Low | G06F 3/1415 718/1 |
| 2011/0179136 A1* | 7/2011 | Twitchell, Jr. | H04L 45/586 709/217 |
| 2011/0185064 A1* | 7/2011 | Head | G06F 9/5077 709/226 |
| 2013/0263130 A1* | 10/2013 | Sugihara | G06F 9/455 718/1 |
| 2013/0326177 A1* | 12/2013 | Oiwa | G06F 3/0647 711/162 |

(Continued)

*Primary Examiner* — Wei Zhen
*Assistant Examiner* — Brahim Bourzik
(74) *Attorney, Agent, or Firm* — Rabin & Berdo, P.C.

(57) ABSTRACT

Disclosed is a virtual desktop service method. The virtual desktop service method includes configuring and measuring users and resources according to predetermined criteria, copying operating system files and data files to be provided to the users before use request, receiving request to use a virtual machine from any one of the users and performing user authentication and work approval, and providing an operating system file and a data file of the any one of the users, among the copied operating system files and data files, to the any one of the users according to the use request to transmit a virtual desktop environment. Consequently, the virtual desktop service method performs a service to provide a virtual machine to a user in real time.

10 Claims, 21 Drawing Sheets

(56) References Cited

U.S. PATENT DOCUMENTS

| | | | |
|---|---|---|---|
| 2013/0326506 A1* | 12/2013 | McGrath | G06F 9/45558 |
| | | | 718/1 |
| 2014/0082165 A1* | 3/2014 | Marr | G06F 9/5044 |
| | | | 709/222 |
| 2014/0096133 A1* | 4/2014 | Kundu | G06F 9/455 |
| | | | 718/1 |
| 2014/0282889 A1* | 9/2014 | Ishaya | H04L 63/08 |
| | | | 726/4 |
| 2018/0041515 A1* | 2/2018 | Gupta | H04L 63/102 |

\* cited by examiner

FIG. 21

| ETRI DaaS Client Login | ☒ |

JOIN Us

| NAME | etri | CREATE |
| ID | etri1 | DEL |
| PW | 1234 | Cancel |
| VM_USAGE | PRESET | |
| Office_ID | 111 | |
| Tel | 042-860-1624 | |
| E-mail | etri@etri.re.kr | |

VIRTUAL DESKTOP SERVICE APPARATUS AND METHOD

This application claims the benefit of Korean Patent Application No. 10-2013-0125207, filed on Oct. 21, 2013, which is hereby incorporated by reference as if fully set forth herein.

BACKGROUND OF THE INVENTION

Field of the Invention

The present invention relates to a virtual desktop service apparatus and method.

Discussion of the Related Art

Virtual desktop service is a service which provides hard discs for storing data and application programs in an Internet space. For example, virtual desktop service is a service for enabling a client system to access and use a virtual machine executed in a virtual desktop server.

Conventionally, virtual desktops are provided in a mode in which a terminal service, such as remote desktop connection (RDC), is provided using a remote desktop protocol (RDP) for Microsoft (MS), a mode in which a terminal service, such as virtual network computing (VNC), is provided using a remote frame buffer (RFB) protocol for Linux, and a mode in which a terminal service solution is provided using a PC-over-IP (PCoIP) protocol for Teradici.

In order to perform virtual desktop service using the conventional modes, it is necessary to provide a virtual desktop function to each user. To this end, it is necessary to assign devices (CPU, memory, HDD, USB, etc.) corresponding to each user and an operating system (OS) image for each user to the user.

Virt-tool, Virt-manager, etc. have been proposed as open tools for providing such a function. A virtual machine for users may be created and generated using a program, such as xendesktop, VMware Fusion, or workstation, of Citrix. However, the conventional modes are manual tools, which are not suitable to provide real-time virtual service. In addition, each user continuously needs an image and configuration files for virtual desktop service. However, there are few tools for real service, such as restriction of a storage space, copying a large-capacity file, and provision of various types of golden images and template files based on provided service types. Existing tools do not provide real-time service.

In recent years, much research and standardization activity have been conducted into virtual desktop service as a service which provides hard discs for storing data and applications in an Internet space.

Korean Patent Application Publication No. 2010-0123847, No. 2009-0111576, and No. 2009-0111576 disclose virtual desktop service technology.

However, architecture for such virtual desktop service has not yet been standardized. As a result, it is not possible to efficiently provide virtual desktop service to users.

Korean Patent Application Publication No. 2009-0108868 discloses a virtual machine management system that is capable of assigning a processor to a plurality of virtual machines. However, it is difficult to apply the disclosure of this publication to a method of configuring a virtualization management system.

Therefore, there is a high necessity for new technology that is capable of providing a virtualization desktop environment and managing a virtualization desktop system.

SUMMARY OF THE INVENTION

Accordingly, the present invention is directed to a virtual desktop service apparatus and method that substantially obviate one or more problems due to limitations and disadvantages of the related art.

In particular, an object of the present invention is to provide a virtual desktop service apparatus and method that are capable of providing real-time virtual desktop service.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance with the purpose of the present invention, as embodied and broadly described herein, a virtual desktop service apparatus includes a resource pool for providing software resources including operation system files, data files, and user profiles for virtual desktop service, a virtual machine infrastructure for configuring and measuring users and resources according to predetermined criteria and for previously copying the operating system files and the data files to be provided to the users in order to provide the operating system files and the data files to the users before a use request, and a connection broker for receiving a request to use a virtual machine from any one of the users and performing user authentication and work approval, wherein the virtual machine infrastructure provides an operating system file and a data file of the any one of the users, among the copied operating system files and data files, to the any one of the users according to the use request to transmit a virtual desktop environment.

The virtual machine infrastructure may check the maximum number of files that can be installed, the maximum number of files that can be maintained, the minimum number of files that can be maintained, available work capacity of a server, and position of the files to configure and measure the resources.

The virtual machine infrastructure may check the number of current virtual machines, the number of previously prepared virtual machines, and a current work amount of the server and, when the sum of the number of current virtual machines and the number of previously prepared virtual machines is less than the maximum number of files that can be installed and the number of previously prepared virtual machines is less than the maximum number of files that can be maintained, copy the operating system files and the data files.

When the number of previously prepared virtual machines is 0 or is less than the minimum number of files that can be maintained, the virtual machine infrastructure may copy the operating system files and the data files.

When the number of previously prepared virtual machines is equal to or greater than the minimum number of files that can be maintained and the current work amount of the server is less than the available work capacity of the server, the virtual machine infrastructure may copy the operating system files and the data files.

In another aspect of the present invention, a virtual desktop service method includes configuring and measuring users and resources according to predetermined criteria, copying operating system files and data files to be provided to the users before use request, receiving request to use a virtual machine from any one of the users and performing user authentication and work approval, and providing an operating system file and a data file of the any one of the users, among the copied operating system files and data files, to the any one of the users according to the use request to transmit a virtual desktop environment.

The configuring and measuring step may include checking the maximum number of files that can be installed, the maximum number of files that can be maintained, the minimum number of files that can be maintained, available work capacity of a server, and position of the files to configure and measure the resources.

The copying step may include checking the number of current virtual machines, the number of previously prepared virtual machines, and a current work amount of the server and, when the sum of the number of current virtual machines and the number of previously prepared virtual machines is less than the maximum number of files that can be installed and the number of previously prepared virtual machines is less than the maximum number of files that can be maintained, copying the operating system files and the data files.

The copying step may include, when the number of previously prepared virtual machines is 0 or is less than the minimum number of files that can be maintained, copying the operating system files and the data files.

The copying step may include, when the number of previously prepared virtual machines is equal to or greater than the minimum number of files that can be maintained and the current work amount of the server is less than the available work capacity of the server, copying the operating system files and the data files.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings:

FIG. 21 is a view showing an interface of the virtual machine provisioning method for real-time virtual desktop service according to the embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the description of the present invention, detailed explanations of known configurations or functions are omitted when it is deemed that they may unnecessarily obscure the gist of the invention.

In addition, the terms first, second, A, B, (a), (b), etc. may be used to describe elements of the present invention. These terms are used only to distinguish one element from another element and, therefore, essence, order, or sequence of the elements is not limited by these terms. When it is described that one element is "connected," "coupled," or "accessed" to another element, it should be understood that one element may be "connected," "coupled," or "accessed" to another element via a further element although one element may be directly connected or accessed to another element.

Figure 1:
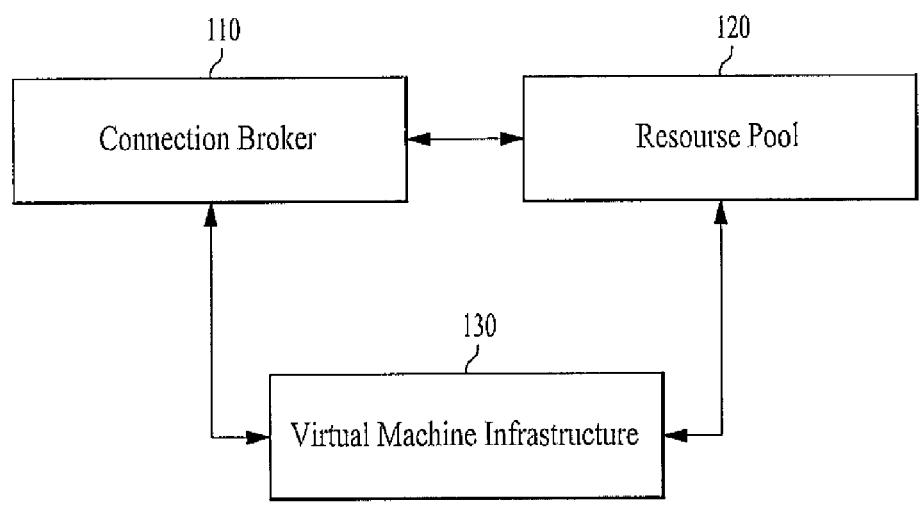
FIG. 1 is a view showing a service architecture for virtual desktop service according to an embodiment of the present invention.

FIG. 1 is a view showing a service architecture for virtual desktop service according to an embodiment of the present invention.

A service provider provides virtual desktop service to an end-user through several steps, which may be performed by three main actors including a connection broker (CB) 110, a resource pool 120, and a virtual machine infrastructure 130 as shown in FIG. 1.

Hereinafter, functions of the three main actors will be described with reference to FIG. 2.

Figure 2:
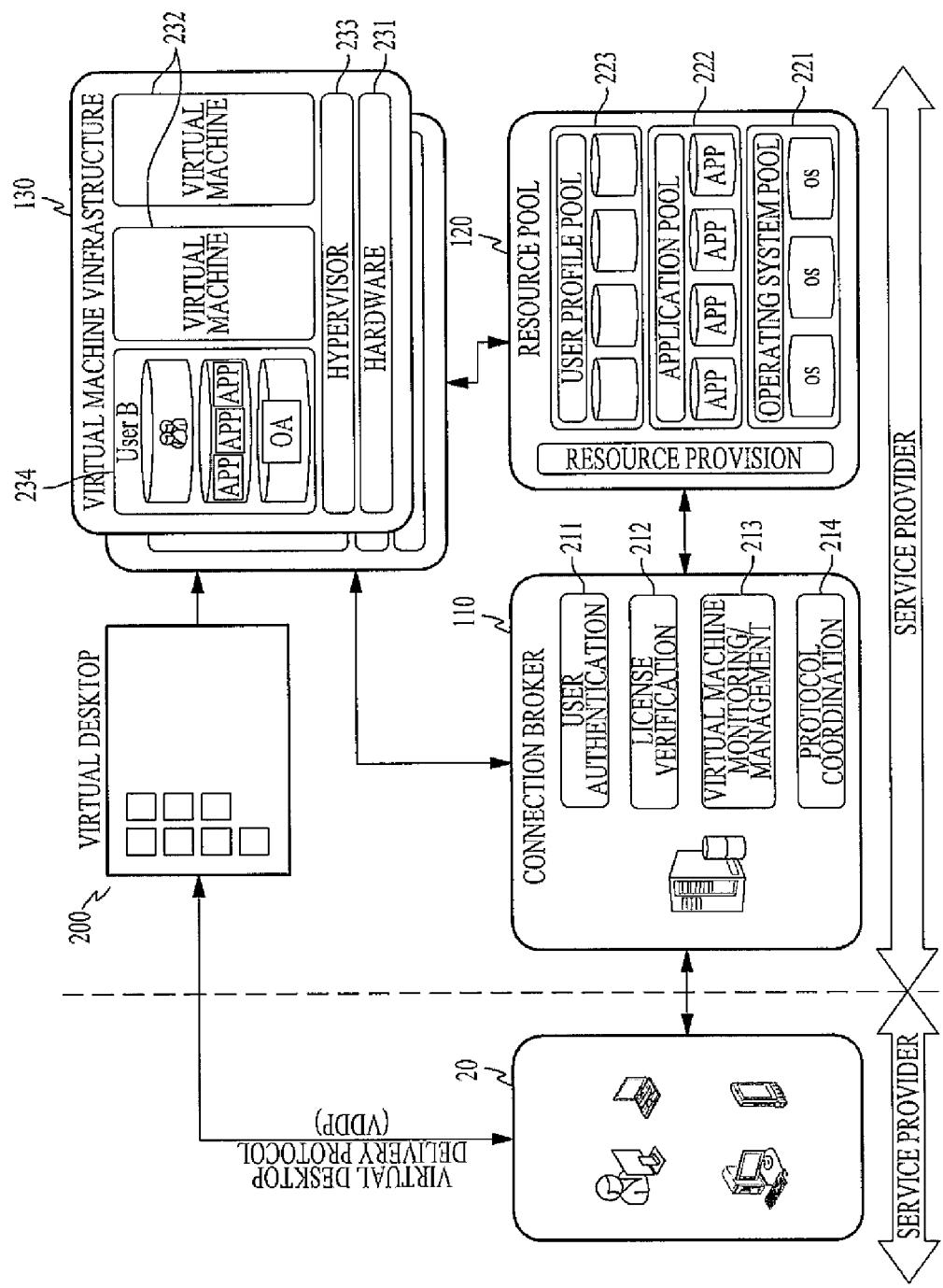
FIG. 2 is a conceptual diagram of the service architecture for virtual desktop service according to the embodiment of the present invention.

FIG. 2 is a conceptual diagram of the service architecture for virtual desktop service according to the embodiment of the present invention.

Referring to FIG. 2, the connection broker 110 may be a software program for enabling a user terminal 20 to be connected to a virtual desktop 200. The connection broker 110 performs a user authentication function 211 and a license verification function 212 for validating the user terminal 20 and software of the user terminal 20, a function of managing a virtual machine (VM) assigned to the user terminal 20, a server monitoring function 213 for measuring an activity level of the virtual machine, and a protocol coordination function 214 for enabling the same protocol between the user terminal 20 and the server.

The connection broker 110 may provide connection between a backup storage and virtual desktop servers.

Referring to FIG. 2, the resource pool 120 may manage three different type high-capacity software resources, such as operating systems (OS), applications, and user profiles, to on-demand virtual desktop service. That is, as shown in FIG. 2, the resource pool 120 includes an OS pool 221, an application pool 222, and a user profile pool 223.

The software resources managed by the resource pool 120 are transmitted to a specific virtual machine in a streaming form at a predetermined time such that the software resources are executed by the specific virtual machine.

The resource pool 120 may provide provision information 224 on the corresponding software resources according to request from the connection broker 110.

For example, the above-mentioned user profiles may include individual information on a hardware construction (for example, CPU, RAM, I/O, etc.), a used operating system (OS), a selected application, user computing environment information (for example, display resolution, Internet access mode, etc.). The user profiles may be managed per user.

Referring to FIG. 2, the virtual machine infrastructure 130 supports hardware resources 231 and generates a virtual machine (VM) 232.

In the virtual desktop server, for example, virtualization technology, which is also referred to as a hypervisor 233, is very necessary to efficiently use the above-mentioned hardware resources 231.

The hypervisor 233 abstracts and dynamically assigns physical hardware resources 231 to an upper level of software 234.

That is, the hardware resources 231 supported in the virtual machine infrastructure 130 may be efficiently used by hypervisor virtualization technology in the virtual desktop server for abstracting and dynamically assigning the physical hardware resources 231 to the upper level of the software 234.

As a result, the virtual machine infrastructure 130 provides virtual machines 231 in which the software 234 of the user terminal 20 is executed. The virtual machines are referred to as virtual desktops 200.

Hereinafter, a virtual desktop service method will be described with reference to FIG. 3. FIG. 2, which is a conceptual diagram of the service architecture for virtual desktop service, is also referred to.

Figure 3:
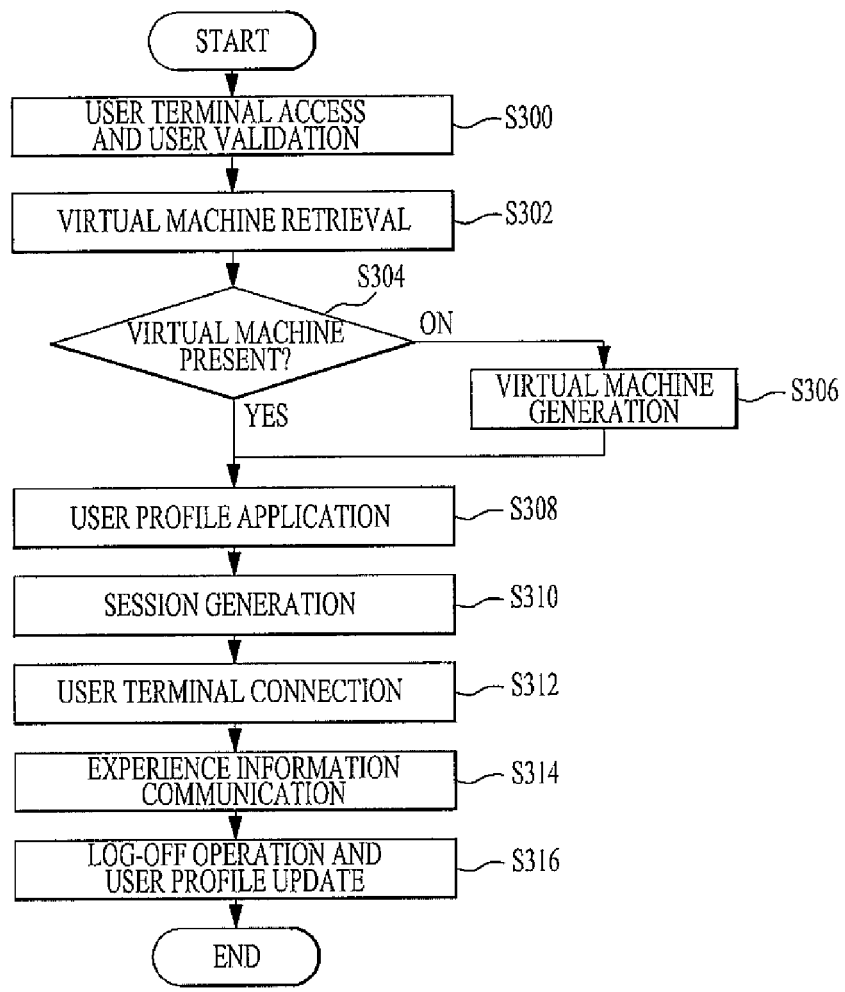
FIG. 3 is a flowchart showing a virtual desktop service method according to an embodiment of the present invention.

FIG. 3 is a flowchart showing a virtual desktop service method according to an embodiment of the present invention.

Referring to FIG. 3, the virtual desktop service method according to the embodiment of the present invention includes a user terminal access and user validation step (S300), a virtual machine retrieval step (S302), a user profile application step (S308), a session generation step (S310), a user terminal connection step (S312), an experience information communication step (S314), and a log-off operation and user profile update step (S316).

At the user terminal access and user validation step (S300), when access of the user terminal 20 is performed through at least one security protocol selected from between a secure shell (SSH) and transport layer security (TLS), the connection broker 110 validates a user based on a user ID and password.

At the virtual machine retrieval step (S302), the connection broker 110 identifies a corresponding user profile for assigning a virtual machine and retrieves a virtual machine satisfying hardware construction of the user terminal 20 and the most suitable for a computing environment using a provisioning function.

It is determined (S304) whether a virtual machine has been retrieved based on the retrieval result as the virtual machine retrieval step (S302). Upon determining that no proper virtual machine has been retrieved, the connection broker 110 transmits information on hardware construction to request the virtual machine infrastructure 130 to generate a virtual machine. As a result, the virtual machine infrastructure 130 generates a virtual machine (S306).

At the user profile application step (S308), after a virtual machine is assigned or generated, the connection broker 110 applies the user profile to the assigned or generated virtual machine.

At the user profile application step (S308), the connection broker 110 may install an operation system (OS) and applications for constructing the virtual desktop 200.

At the session generation step (S310), a session for transmitting the virtual desktop 200 is generated in the virtual machine infrastructure 130 and session information of the generated session is dispatched to the connection broker 110.

At the user terminal connection step (S312), the connection broker 110 transmits the session information to the user terminal 20 and the user terminal 20 is connected to the virtual machine infrastructure 130.

At the experience information communication step (S314), the user terminal 20 communicates experience information of users to the virtual desktop 200 using a virtual desktop delivery protocol (VDDP).

At the log-off operation and user profile update step (S316), the user terminal 20 performs a log-off operation to prevent loss of user data when the virtual desktop service is terminated. During the log-off operation, the connection broker 110 updates changed user profile in the user profile pool 223.

At the log-off operation and user profile update step (S316), the connection broker 110 may return the corresponding virtual machine such that the corresponding virtual machine is available.

Hereinafter, a functional layer of virtual desktop service according to an embodiment of the present invention will be described with reference to FIGS. 4 and 5.

Figure 4:
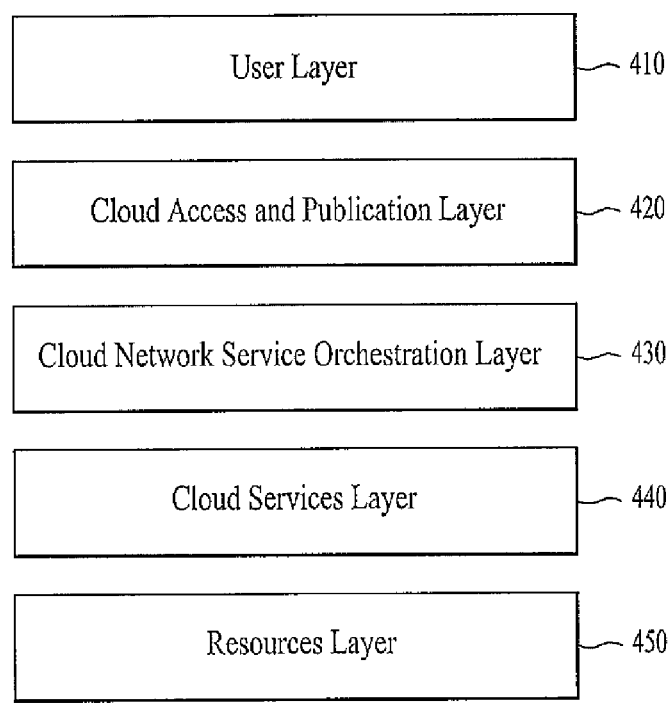
FIG. 4 is a view showing a functional layered architecture for virtual desktop service according to an embodiment of the present invention.

FIG. 4 is a view showing a functional layered architecture for virtual desktop service according to an embodiment of the present invention.

Referring to FIG. 4, the functional layered architecture for virtual desktop service according to the embodiment of the present invention includes functional layers, such as a user layer 410, a cloud access and publication layer 420, a cloud network service orchestration layer 430, a cloud services layer 440, and a resource layer 450.

Hereinafter, the respective functional layers will be described with reference to FIG. 5.

Figure 5:
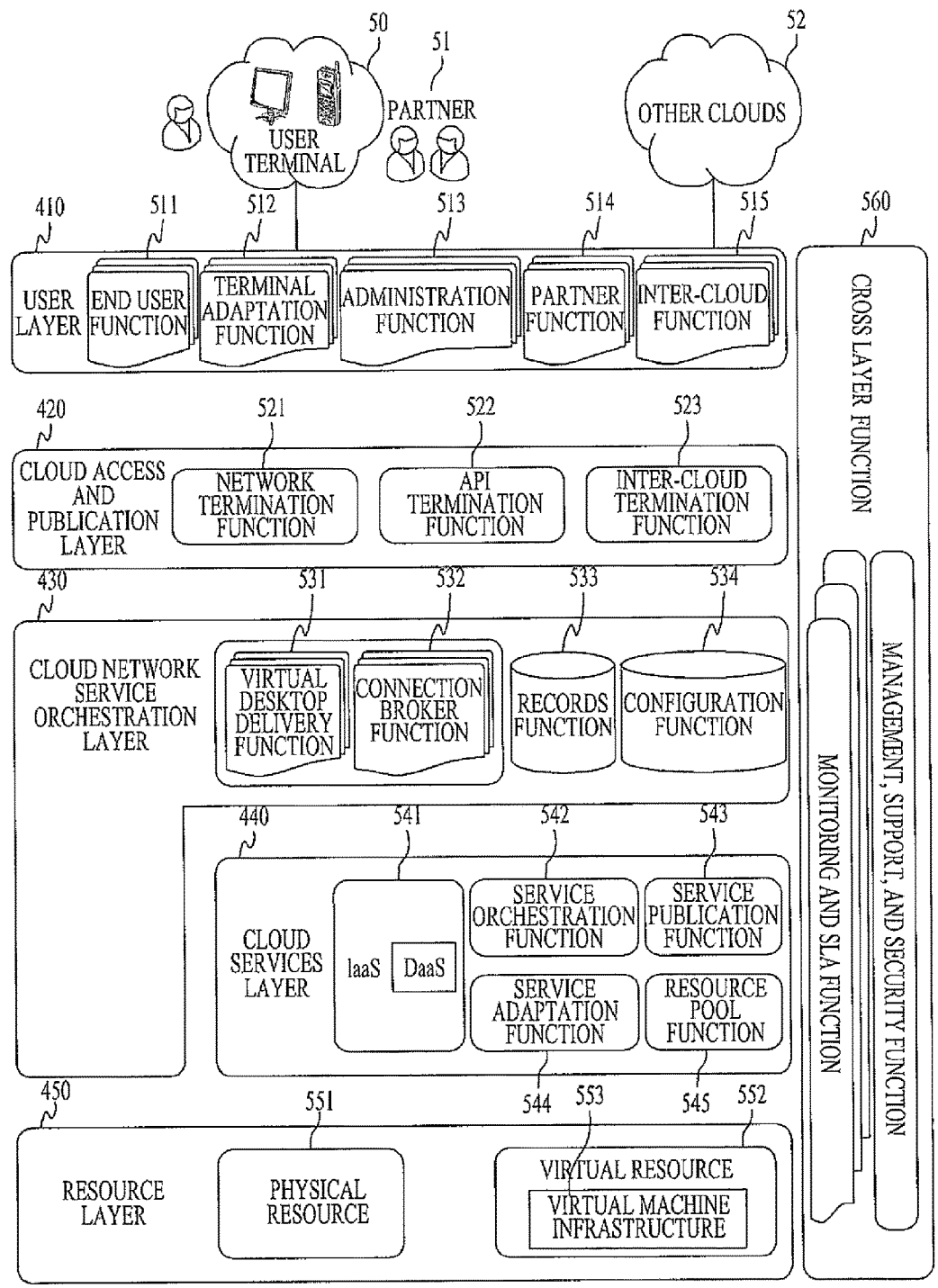
FIG. 5 is a conceptual diagram of the functional layered architecture for virtual desktop service according to the embodiment of the present invention.

FIG. 5 is a conceptual diagram of the functional layered architecture for virtual desktop service according to the embodiment of the present invention.

Referring to FIG. 5, the user layer 410 is used to perform interaction between a user terminal 50 and a cloud infrastructure, to transmit cloud service request, to perform cloud service access, and to manage or monitor cloud resources. The user layer 410 includes an end user function 511, a terminal adaptation function 512, an administration function 513, a partner function 514 with a partner 510, and an inter-cloud function 515.

When a cloud receives cloud service request, the cloud orchestrates its own resources or resources of another cloud through the inter-cloud function 515 and provides cloud service through the inter-cloud function 515.

The end user function 511 supports an end-user, i.e. the user terminal 50, to access and consume cloud service.

The administration function 513 supports an enterprise administrator to administer cloud resources and service in a business process.

The partner function 514 enables a partner relationship through a cloud service provider.

The inter-cloud function 515 provides an interconnection interface and broker function for interconnection between several cloud service providers (CSPs) and clouds. The inter-cloud function 515 includes an inter-cloud service broker function and an inter-cloud portal function.

The inter-cloud service broker function provides an alternative solution of cloud users or application for accessing cloud service and resources of other CSPs 52.

The user terminal for virtual desktop service may be a laptop computer, a desktop PC, a thin client, or a mobile phone.

In addition, terminal adaptation means a function for enabling a terminal device to provide a proper desktop among various resolutions having other peripherals in another bandwidth environment.

Referring to FIG. 5, the cloud access and publication layer 420 provides a common interface for manual or automated cloud actions and consumption and accepts cloud service consumption request of consumers or business processes using a cloud application program interface (API) for accessing service and resources of cloud service providers (CSPs). The cloud access and publication layer 420 includes a network termination function, an API termination function, and an inter-cloud mediation function.

Referring to FIG. 5, the a cloud network service orchestration layer 430 includes a virtual desktop delivery function 531 for encapsulating and delivering access to an overall information system environment or access to a remote client device through a network and a connection broker function 532 including an authentication entity in which the connection broker provides approved access to a combination of individualized applications for another security level by consulting a directory server to authenticate a user desktop session, a coordination entity in which the connection broker coordinates a common communication protocol for data and video transmission, among various communication protocols between the user terminal and the virtual desktop, to be used between the user terminal and the virtual desktop after authentication of the user desktop session, a monitoring and management entity in which the connection broker performs runtime monitoring of a virtual machine and performs an action guaranteeing an operation environment for necessary applications, and a verification entity in which the connection broker provides a software license verification function such that the user terminal 50 accesses an approved application hosted in the virtual desktop.

In the virtual desktop delivery function 531, the virtual desktop delivery protocol (VDDP) is a core component of the virtual desktop delivery function 531. For example, the virtual desktop delivery protocol (VDDP) provides a communication channel between the server and the user terminal 50 for Desktop as a Service (DaaS) to transmit all interaction information, such as display, input, cursor, control and construction, and monitoring information.

In the monitoring and management entity, the connection broker may instruct the virtual machine infrastructure to assign a new idle virtual machine instance to newly received request or to assign a previous instance for request issued by a client side device after restoration of system failure. In addition, the connection broker may instruct to the virtual machine infrastructure to prepare a new cloud virtual machine for a new login user session.

The cloud network service orchestration layer 430 further includes a records function 533 and a configuration function 534.

Referring to FIG. 5, the cloud services layer 440 includes a Desktop as a Service (DaaS) function 541 for providing virtual desktop service to the user terminal 50 through a wideband network and a resource pool function 545 for supporting a network-based boot strap protocol which is a wide resource repository or repository server set in which a guest OS and applications are serialized and stored, has a visualized modeling tool for generating a virtual template enabling a cloud virtual machine to be generated in the virtual machine infrastructure, has capability for dynamically assembling a necessary resource including an operating system, application software, a user profile, and system configuration from the virtual desktop under execution and for producing a corresponding image file, and enables communication with the virtual machine infrastructure and a virtual desktop to be remotely generated from the serialized image file.

As shown in FIG. 5, the cloud services layer 440 may include a service orchestration function 542, a service publication function 543, and a service adaptation function 544.

Referring to FIG. 5, the a resource layer 450 has a physical resource 551 including a computing resource, a storage resource, a network resource, a power resource, and other required facilities in a cloud computing environment and a virtual resource 552 including a virtual machine, a virtual network resource, and a virtual storage resource.

The virtual machine means a virtual machine generated in a virtual machine infrastructure 553 by different server virtualization technologies, such as XEN and KVM.

Referring to FIG. 5, the functional layered architecture for virtual desktop service according to the embodiment of the present invention may further provide a cross layer function 560 including a monitoring and SLA function and a management, support, and security function.

The above-mentioned virtual machine infrastructure 553 means a cluster environment having a HA characteristic. In the virtual machine infrastructure 553, many executable virtual machine instances are generated from the same virtual machine template as the same parameter. Since the virtual machine infrastructure 553 provides virtual machine migration capability, the virtual machine infrastructure 553 enables an instance being executed to migrate to another hosting server in case of system failure to maintain business continuity.

The virtual desktop service described in this specification may be a service for providing a data storage hard disc and applications in an Internet space. That is, the virtual desktop service may be a desktop service using a virtual machine based on desktop virtualization technology, not real physical hardware, such as a personal computer or a business desktop. The generated desktop virtual machine is remotely located in an Internet data center such that the desktop virtual machine can be used as a local desktop any where any time.

The virtual desktop service described in this specification may be a Desktop as a Service (DaaS) service, a cloud computing service, or a cloud desktop service.

The architecture (service architecture or functional layered architecture) for virtual desktop service according to the embodiment of the present invention may be a system or server providing virtual desktop service to a user terminal or a design form thereof.

Figure 6:
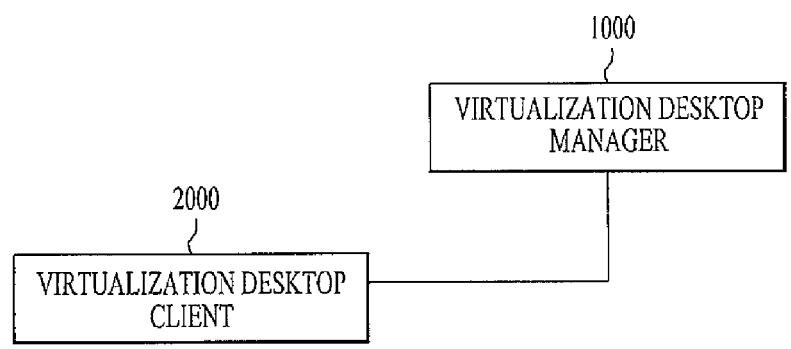
FIG. 6 is a view showing construction of a desktop virtualization system according to an embodiment of the present invention.

FIG. 6 is a view showing construction of a desktop virtualization system according to an embodiment of the present invention.

Referring to FIG. 6, a desktop virtualization system (hereinafter, referred to as a DaaS system) according to an embodiment of the present invention includes a virtualization desktop manager device 1000 and a virtualization desktop client device 2000.

The virtualization desktop manager device 1000 provides a function of assigning a virtualization desktop server to the virtualization desktop client device 2000 and managing generation, management, disappearance, and migration of the virtual machine according to user request.

The virtualization desktop manager device 1000 and the virtualization desktop client device 2000 will hereinafter be described in detail with reference to FIGS. 7 and 8.

Figure 7:
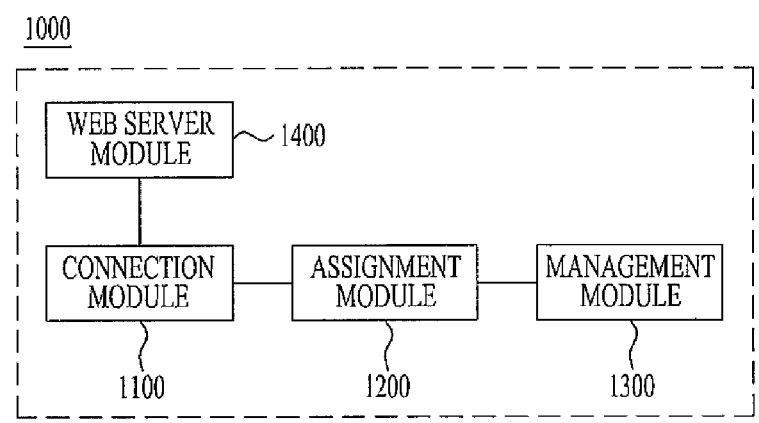
FIG. 7 is a view showing a virtualization desktop manager device according to an embodiment of the present invention.

FIG. 7 is a view showing a virtualization desktop manager device according to an embodiment of the present invention.

Referring to FIG. 7, the virtualization desktop manager device according to the embodiment of the present invention includes a connection module 1100, an assignment module 1200, a management module 1300, and a web server module 1400.

The connection module 1100 allows connection between the virtualization desktop client device 2000 and a virtualization desktop server for a user for which user authentication has been completed.

In order to remotely receive virtual desktop service through the DaaS system, the user accesses the connection module 1100 for connection with the virtualization desktop server.

At this time, the connection module 1100 allows assignment of an arbitrary virtual machine to the user who has accessed according to user authentication through user request information and virtual machine information of the virtualization desktop server constituting the current system.

In addition, after assignment of the virtualization desktop server, the connection module 1100 may provide a connection function and a screen redirection function of a virtualization desktop environment using a remote access protocol of the assigned virtualization desktop server.

In addition, after use of the assigned virtualization desktop server, the connection module 1100 may store a current environment configuration according to a user account and remove the virtualization desktop connection function and the screen redirection function such that the user can access again at a desired time.

The assignment module 1200 checks operation states of the virtualization desktop servers and assigns a virtualization desktop server optimum to the virtualization desktop client device 2000.

At this time, the assignment module 1200 may provide a virtual machine provisioning function of monitoring resource use of the virtualization desktop servers and assignment information of the virtual machine in real time to assign the virtualization desktop server supporting optimum virtual desktop service to the remote user requesting the virtual desktop service through the connection module 1100.

At this time, the assignment module 1200 may monitor a resource assignment state and use information of the virtualization desktop servers constituting the DaaS system and whether the generated virtual machines are used in real time.

At this time, the assignment module 1200 may provide the best user-customized virtualization desktop server to the remote user and, when the virtual machine has a problem, assign another virtual machine to the remote user in real time.

At this time, the assignment module 1200 may separate a file for operating the virtual machine and a user disc file of the virtualization desktop client device 2000 from each other to assign the virtualization desktop server.

The management module 1300 monitors operation states of the virtualization desktop server and the virtual machine and executes a control command of the virtualization desktop server.

The web server module 1400 provides a web-based management tool GUI to the user.

Figure 8:
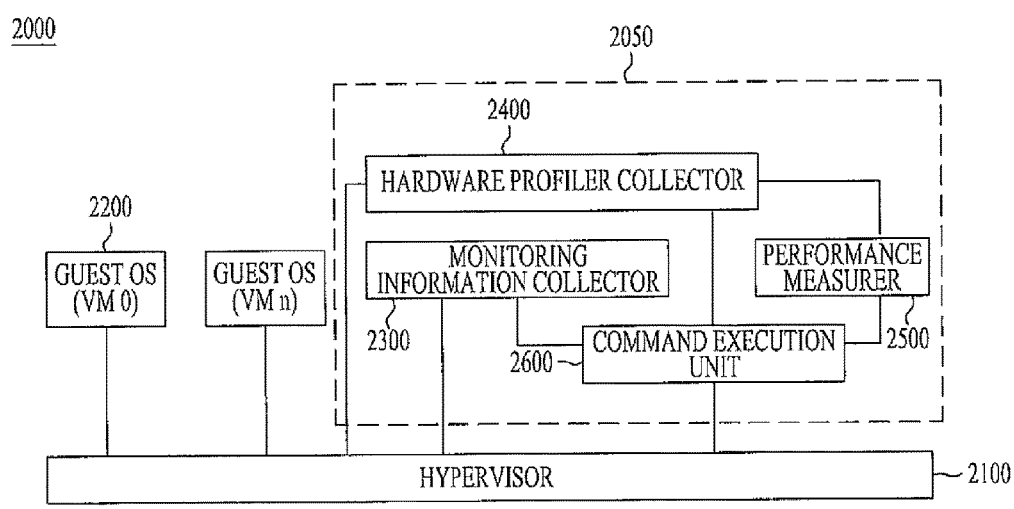
FIG. 8 is a view showing a virtualization desktop client device according to an embodiment of the present invention.

FIG. 8 is a view showing a virtualization desktop client device according to an embodiment of the present invention.

Referring to FIG. 8, the virtualization desktop client device 2000 according to an embodiment of the present invention includes a hypervisor 2100, a monitoring information collector 2300, a hardware profile collector 2400, a performance measurer 2500, and a command execution unit 2600.

The monitoring information collector 2300, the hardware profile collector 2400, the performance measurer 2500, and the command execution unit 2600 may constitute a virtualization desktop agent 2050.

The hypervisor 2100 receives at least one virtual machine 2200 on hardware.

The hypervisor 2100 may communicate with the virtual machine 2200 and the components of the virtualization desktop agent 2050 using a programmed daemon.

The virtual machine 2200 may be formed of a full virtualization type or a half virtualization type.

The monitoring information collector 2300 monitors the virtual machine 2200.

The hardware profile collector 2400 collects hardware information and OS level information of the virtualization desktop client device 2000.

The performance measurer 2500 calculates performance information of the virtual machine 2200 using information monitored by the monitoring information collector 2300.

The command execution unit 2600 buffers and executes a control command received from the virtualization server.

The control command related to control of the virtual machine may be controlled through the programmed daemon and the command related to the virtualization desktop client device 2000 may be processed by the hypervisor 2100 and the OS level.

Meanwhile, TCP/UDP is used as a network protocol of the virtualization desktop system and a method of driving the same will hereinafter be described in detail with reference to FIGS. 9 and 10.

Figure 9:
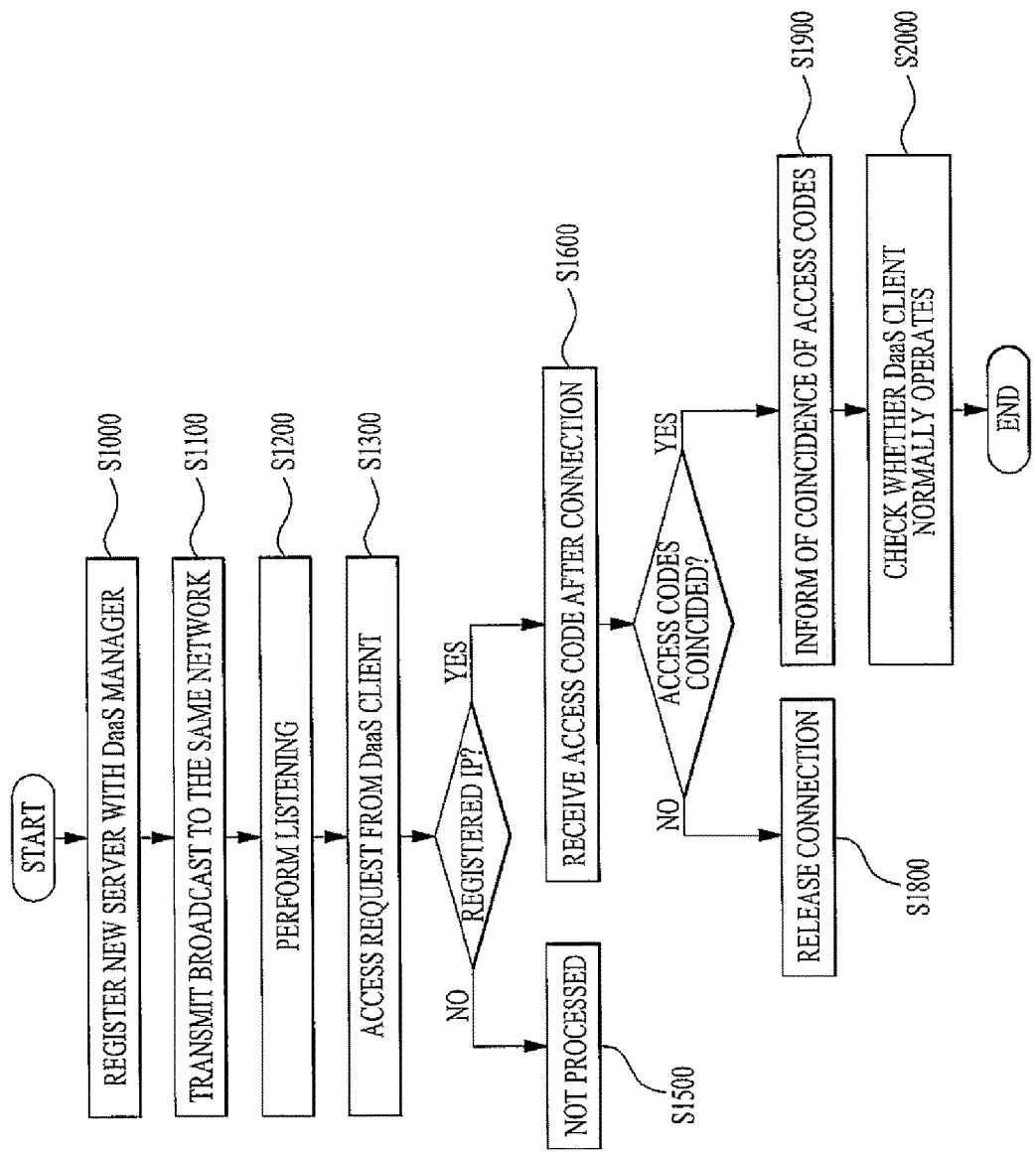
FIG. 9 is a flowchart showing a management method through the virtualization desktop manager device according to the embodiment of the present invention.

FIG. 9 is a flowchart showing a management method through the virtualization desktop manager device according to the embodiment of the present invention.

Referring to FIG. 9, in the management method through the virtualization desktop manager device according to the embodiment of the present invention, first, a new server is registered with the virtualization desktop manager device 1000 by a user (S1000).

The new server is registered as follows. First, a user attempts to access the virtualization desktop client device 2000. A new user accesses the connection module 1100. Subsequently, the user receives a member ID and password through a joining process. The user accesses the virtualization desktop manager device 1000 using the received access ID and the virtualization desktop manager device 1000 generates a new file. The virtualization desktop manager device 1000 selects a preset virtualization file proper to an existing user pattern as the new file or generates a new file through configuration of a CPU, memory, and HDD desired by the user. After generation, information is owned by the connection module 1100. The connection module 1100 requests redirection to the file generated for service from the management module 1300 and subsequent management is continuously performed by the management module 1300.

Subsequently, the virtualization desktop manager device 1000 transmits an IP and access port of the virtualization desktop manager device 1000 to all servers registered with the same network in a broadcast mode (S1100).

For transmission without change of the registered client devices when changing the IP of the server of the virtualization desktop manager device 1000, the IP and access port of the virtualization desktop manager device 1000 may be transmitted and retransmitted at predetermined intervals when there is no access to a new server.

Subsequently, the virtualization desktop manager device 1000 is driven as a TCP server and performs listening to the broadcasted port (S1200).

Subsequently, upon receiving a connection request message (TCP connection) from the virtualization desktop client device 2000 (S1300), it is checked whether the corresponding client device is a client device IP registered with the management server (S1400).

For an unregistered client device IP, the TCP connection is not processed (S1500).

On the other hand, for a registered IP, an access code is received from the client device (S1600).

The access code may be configured to be modified through a GUI of the virtualization desktop manager device.

Subsequently, comparison with the access code received from the virtualization desktop client device 2000 is performed and information on coincidence or not is transmitted to the client device having attempted to access (S1700).

A result value of 1 may be transmitted in a case in which the access codes coincide with each other and a result value of 0 may be transmitted in a case in which the access codes do not coincide with each other.

Meanwhile, in a case in which the access codes do not coincide with each other, corresponding connection is released after transmission of the result that the access codes do not coincide with each other (S1800).

On the other hand, in a case in which the access codes coincide with each other, the result that the access codes coincide with each other is informed (S1900) and it is checked whether the virtualization desktop agent of the virtualization desktop client device normally operates (S2000).

At this time, it may be checked whether access of the accessed virtualization desktop agent is continued through an additional thread or process At this time, the connection may be maintained using a keep-alive function even when there is no transmission of data.

Figure 10:
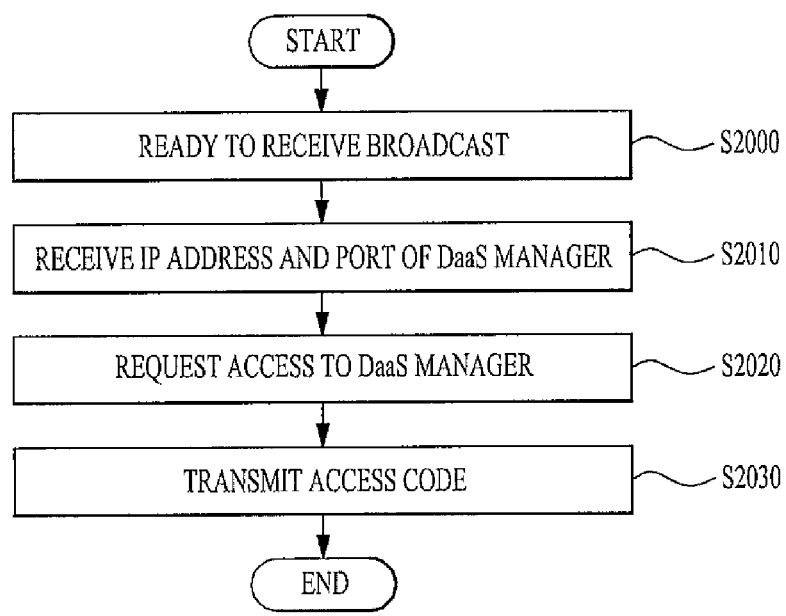
FIG. 10 is a flowchart showing a management method through the virtualization desktop client device according to the embodiment of the present invention.

FIG. 10 is a flowchart showing a management method through the virtualization desktop client device according to the embodiment of the present invention.

Referring to FIG. 10, in the management method through the virtualization desktop client device according to the embodiment of the present invention, first, the virtualization desktop agent is ready to receive the IP and port information transmitted from the virtualization desktop manager device 1000 during first driving in order to access the virtualization desktop manager device 1000 (S3000).

During driving of the virtualization desktop agent, a broadcast receiver code may be first executed. When TCP connection is released during driving of the virtualization desktop agent after the TCP connection, the broadcast receiver code may be executed again.

Subsequently, an IP address and port of the virtualization desktop manager device 1000 are received through the broadcast (S3010) and access to the virtualization desktop manager device 1000 is requested using the received IP address and port (S3020).

Subsequently, after the connection is completed, an access code is transmitted to the virtualization desktop manager device 1000 (S3030).

At this time, the access code may be stored as an additional file.

Subsequently, an access code processing result is waited. When there is an access error, the access is released. Consequently, the broadcast receiver code is executed again.

Figure 11:
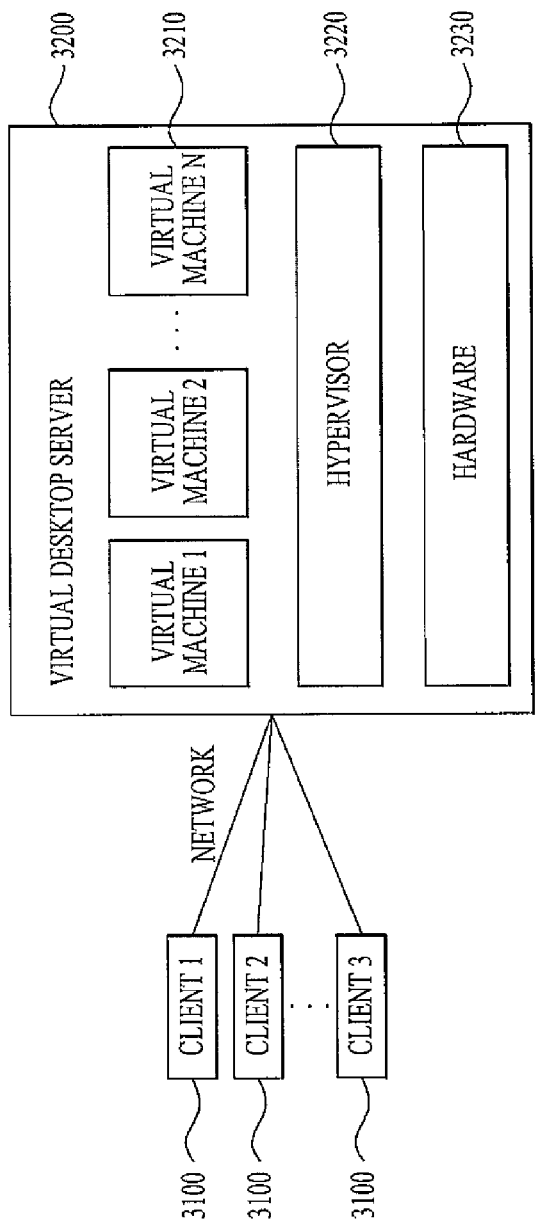
FIG. 11 is a view showing overall structure of a virtual desktop service system.

FIG. 11 is a view showing overall structure of a virtual desktop service system.

Referring to FIG. 11, the virtual desktop service system according to the embodiment of the present invention includes a virtual desktop server 3200 and a plurality of client systems 3100. The client systems 3100 are connected to the virtual desktop server 3200 over a network.

In the virtual desktop server 3200, a hypervisor 3220 is installed and virtual machines 3210 for virtual desktop service are disposed on the hypervisor 3220. Users access the virtual machines 3210 of the virtual desktop server 3200 using the client systems 3100. The virtual machines 3210 are actually performed in the virtual desktop server 3200 and only user input and output are performed in the client systems 3100.

Figure 12:
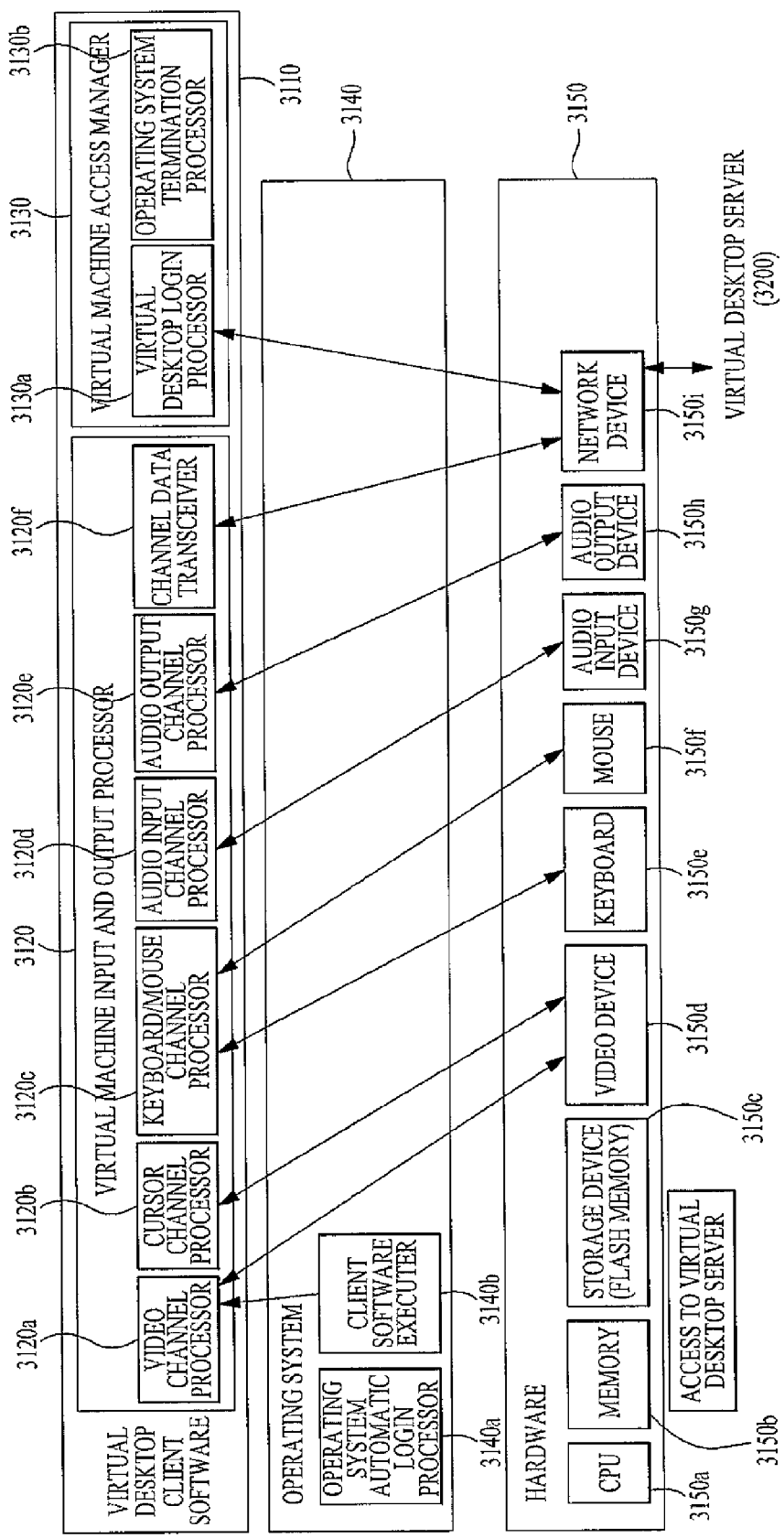
FIG. 12 is a view showing overall structure of a client system according to an embodiment of the present invention.

FIG. 12 is a view showing overall structure of a client system according to an embodiment of the present invention.

Referring to FIG. 12, hardware 3150 of the client system 3100 includes a CPU 3150a, a memory 3150b, a storage device 3150c, a video device 3150d, a keyboard 3150e, a mouse 3150f, an audio input device 3150g, an audio output device 3150h, and a network device 3150i.

The storage device 3150c stores only a client operating system 3140 and virtual desktop client software 3110. The storage device 3150c stores the minimum capacity of the client operating system 3140 and virtual desktop client software 3110 that can be stored.

The operating system 3140 provides an environment for managing the hardware 3150 of the client system and executing the client software 3110.

The client software 3110 includes a virtual machine input and output processor 3120 and a virtual machine access manager 3130.

The virtual machine input and output processor 3120 includes a video channel processor 3120a, a cursor channel processor 3120b, a keyboard/mouse channel processor 3120c, an audio input channel processor 3120d, an audio output channel processor 3120e, and a channel data transceiver 3120f.

The virtual machine access manager 3130 includes a virtual desktop login processor 3130a and an operating system termination processor 3130b.

Figure 13:
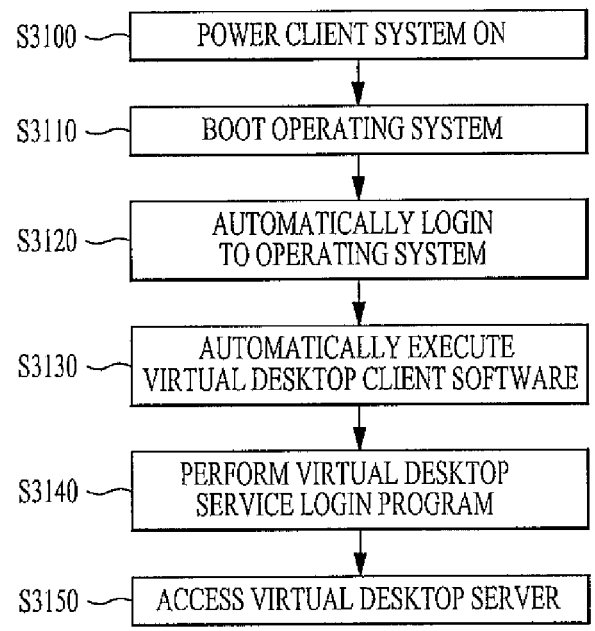
FIG. 13 is a flowchart showing a process of the client system accessing virtual desktop service in accordance with an embodiment of the present invention.

FIG. 13 is a flowchart showing a process of the client system accessing virtual desktop service in accordance with an embodiment of the present invention.

Referring to FIG. 13, when the client system 3100 is powered on, an operating system 3140 for client management is executed (S3100). When the operating system 3140 is booted (S3110), login of the operating system 3140 is automatically performed by an operating system automatic login processor 3140a (S3120).

Subsequently, a client software executer 3140b automatically executes virtual desktop client software 3110 (S3130). When the virtual desktop client software 3110 is executed, the virtual desktop login processor 3130a is performed (S3140).

In order for the virtual desktop login processor 3130a to access the virtual desktop server 3200, it is necessary for the virtual desktop login processor 3130a to know the ID and password of a corresponding virtual machine 3210 and the IP address of the desktop server 3200. Login may be performed using the ID and password of the virtual machine 3210 and the IP address of the desktop server 3200. When the login is successfully performed, access to the corresponding virtual machine 3210 may be achieved and the corresponding virtual machine 3210 may be used (S3150).

The ID and password of the virtual machine 3210 and the IP address of the desktop server 3200 may be input using a login screen or the storage device 3150c of the client system 3100.

Figure 14:
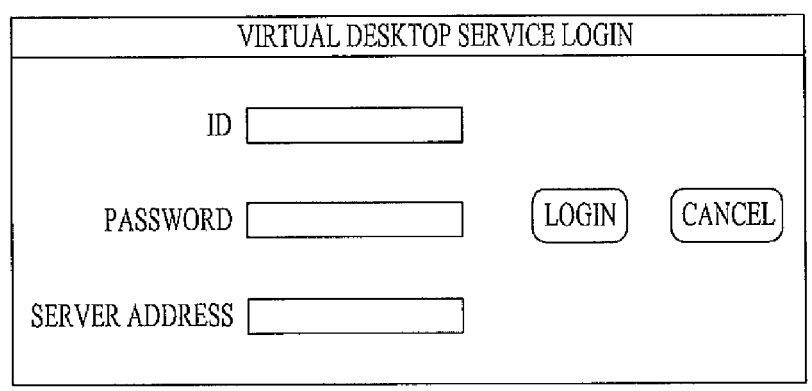
FIG. 14 is a view showing a login screen of the client system.

FIG. 14 is a view showing a login screen of the client system.

As shown in FIG. 14, the ID and password of the virtual machine 3210 and the IP address of the desktop server 3200 may be input for login using the login screen.

The ID and password of the virtual machine 3210 and the IP address of the desktop server 3200 may be stored in the storage device 3150c of the client system 3100 and then automatically output from a corresponding file. In this case, direct access to the virtual machine 3210 is possible without using the login screen.

Figure 15:
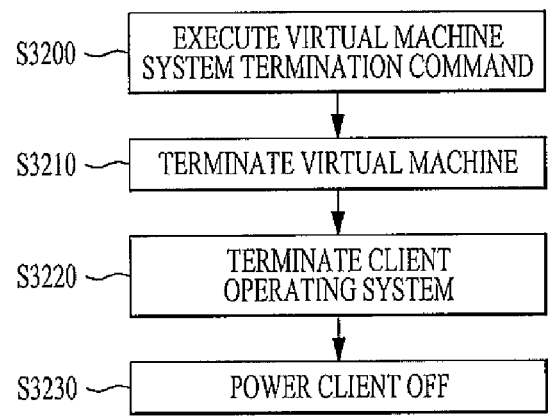
FIG. 15 is a flowchart showing a client system termination process according to an embodiment of the present invention.

FIG. 15 is a flowchart showing a client system termination process according to an embodiment of the present invention.

Referring to FIG. 15, a user executes a system termination command of the virtual machine 3210 (S3200). As a result, the virtual machine 3210 of the virtual desktop server 3200 is terminated (S3210).

Subsequently, the operating system termination processor 3130b of the virtual desktop client software 3110 recognizes that the virtual machine 3210 has been terminated and commands system termination of the client system 3100.

As a result, the operating system 3140 of the client system 3100 is terminated (S3220) and the client system 3100 is also powered off (S3230).

Data exchange between the virtual machine 3210 of the virtual desktop server 3200 and the client system 3100 is achieved through the following channels.

A screen of a monitor is transmitted from the virtual machine 3210 to the client system 3100 through the video channel. A mouse cursor on the screen of the monitor is transmitted from the virtual machine 3210 to the client system 3100 through the cursor channel.

A keyboard/mouse input of the client system 3100 is transmitted to the virtual machine 3210 through the keyboard/mouse channel.

In addition, an audio input of the client system 3100 is transmitted to the virtual machine 3210 through the audio input channel and an audio output of the virtual machine 3210 is transmitted to the client system 3100 through the audio output channel.

The channel data transceiver 3120f includes a channel data transmitter and a channel data receiver.

The virtual desktop server 3200 transmits data corresponding to the respective channels of the virtual machine 3210 to the client system 3100. Data of the virtual machine 3210 are received through the channel data receiver of the client system 3100 and are transmitted to the respective channel processors.

The video channel processor 3120a outputs a screen to the monitor using the video device 3150d and the cursor channel processor 3120b outputs a mouse cursor to a designated position on the monitor.

The audio output channel processor 3120e outputs audio using the audio output device 3150h and the channel data transmitter 3120f transmits input data of the client system 3100 to the virtual machine 3210.

The keyboard/mouse channel processor 3120c transmits a keyboard/mouse input of the client system 3100 to the virtual machine 3210 through the channel data transmitter 3120f.

The audio input channel processor 3120d transmits data received from the audio input device 3150g to the virtual machine 3210 through the channel data transmitter 3120f.

As described above, it is possible to access virtual desktop service immediately after the client system 3100 is powered on. When the virtual machine 3210 of the virtual desktop service is terminated, the client system 3100 is powered off. Consequently, the present invention provides an environment in which users receive virtual machine without recognition of the operating system 3140 for operating the client system 3100 and the virtual desktop client software 3110.

In the present invention, therefore, the client system is powered on through the structure of the exclusive client for virtual desktop service and then connection to the virtual machine of the virtual desktop service is immediately performed. Consequently, it is not necessary for a user to directly execute exclusive software.

In addition, when the virtual machine is terminated, the client system is powered off. Consequently, it is possible for a user to use virtual desktop service without recognition of the client operating system and the client software.

Hereinafter, an embodiment of the connection broker capable of performing a load balancing function to dynamically assign virtual desktop service will be described in detail.

Figure 16:
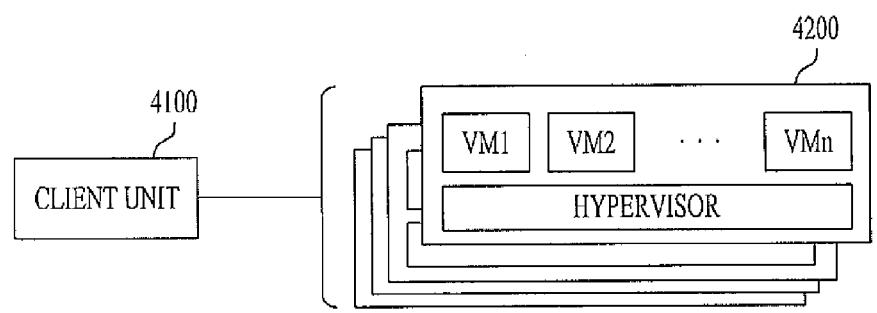
FIG. 16 is a view showing construction of a system for real-time virtual desktop service according to an embodiment of the present invention.

FIG. 16 is a view showing construction of a system for real-time virtual desktop service according to an embodiment of the present invention.

Referring to FIG. 16, the system for real-time virtual desktop service according to an embodiment of the present invention includes a client unit 4100 and a service provider server 4200.

The client unit 4100 requests the service provider server 4200 to assign a virtual machine and receives virtual desktop service through the assigned virtual machine.

The service provider server 4200 allows a user to access virtual machines generated on a hypervisor through the client unit 4100 using an access protocol and to use one of the virtual machines stored in the service provider server 4200.

At this time, a user profile (user information file), a user OS file, and a use disc file are needed to provide the user with the virtual machine.

Figure 17:
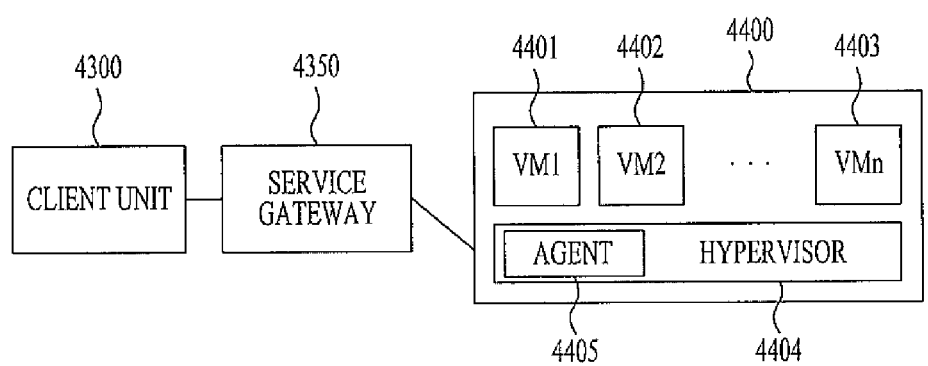
FIG. 17 is a view showing construction of a system for virtual desktop service including a service gateway according to an embodiment of the present invention.

FIG. 17 is a view showing construction of a system for virtual desktop service including a service gateway according to an embodiment of the present invention.

Referring to FIG. 17, the system for virtual desktop service including the service gateway according to the embodiment of the present invention includes a client unit 4300, a service gateway 4350, and a service provider server 4400.

The client unit 4300 transmits a command to request assignment and use of a virtual machine to the service provider server 4400 via the service gateway 4350.

The service gateway 4350 performs an approval procedure for user authentication and determination as to whether a task authority is to be given to the user.

The service gateway 4350 will hereinafter be described in detail with reference to FIG. 18.

The service provider server 4400 includes a plurality of virtual machines 4401, 4402, and 4403 and a hypervisor 4404.

The hypervisor 4404 further includes an agent 4405 for executing the request command transmitted by the client unit 4300 and transmitting the execution result to the client unit 4300 via the service gateway 4350.

Figure 18:
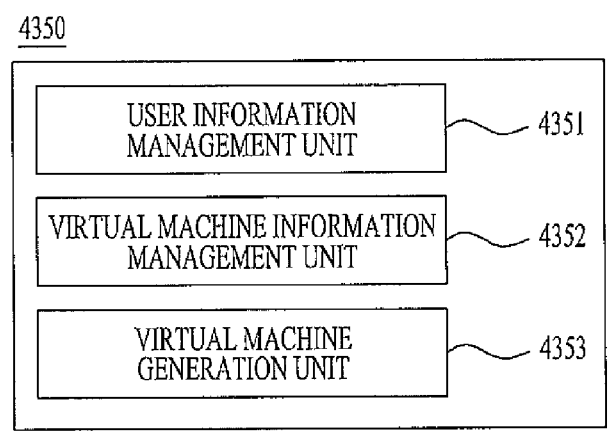
FIG. 18 is a view showing construction of a service gateway for real-time virtual desktop service according to an embodiment of the present invention.

FIG. 18 is a view showing construction of a service gateway for real-time virtual desktop service according to an embodiment of the present invention.

Referring to FIG. 18, the service gateway for real-time virtual desktop service according to the embodiment of the present invention includes a user information management unit 4351, a virtual machine information management unit 4352, and a virtual machine generation unit 4353.

The user information management unit 4351 authenticates user information provided by a user through the client unit.

At this time, the user information management unit 4351 may analyze the user information provided through the client unit to determine whether the user is a registered person.

The virtual machine information management unit 4352 generates virtual machine access information corresponding to the user information provided through the client unit and provides the generated virtual machine access information to the client unit.

The access information may include an address and port number of the service provider server providing the virtual machine.

When the user is classified as a registered person based on the user information analyzed by the user information management unit 4351, the virtual machine information management unit 4352 may determine whether there is any previously generated virtual machine.

When the user is classified as an unregistered person based on the user information analyzed by the user information management unit 4351, the virtual machine information management unit 4352 may request the client unit to register a user ID, password, and virtual machine configuration information in order to generate a new user.

The virtual machine configuration information may include at least one selected from among the number of CPUs, the number of memories, the hard disc capacity, and OS type information of a virtual machine to be provided.

At this time, the virtual machine configuration information may include preset information generated by the virtual machine information management unit 4352 analyzing an authority level of the user information and deciding a domain name and OS type of a virtual machine according to the analyzed authority level.

Meanwhile, in a case in which there is no previously generated virtual machine corresponding to the user information, the virtual machine information management unit 4352 may request the client unit to register virtual machine configuration information.

The virtual machine generation unit 4353 selects a service provider server and generates a virtual machine in the selected service provider server according to the virtual machine generation request of the client unit.

Figure 19:
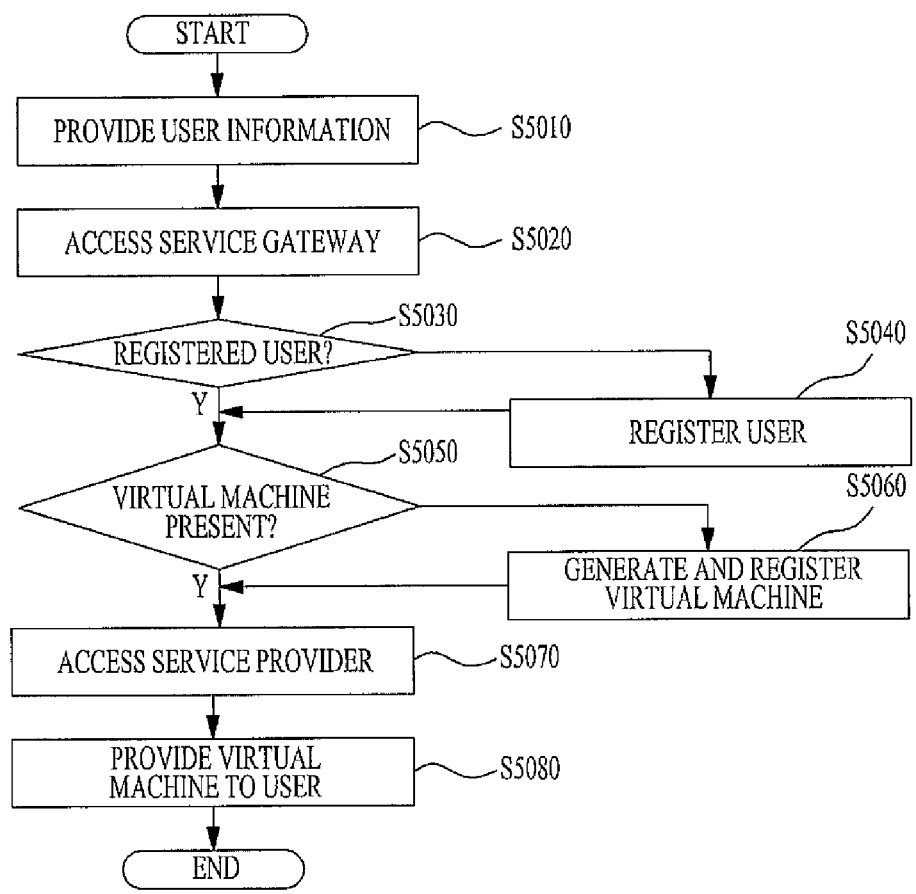
FIG. 19 is a view showing a virtual machine provisioning method for real-time virtual desktop service according to an embodiment of the present invention.

FIG. 19 is a view showing a virtual machine provisioning method for real-time virtual desktop service according to an embodiment of the present invention.

In addition, FIGS. 20 to 23 are views showing interfaces of the virtual machine provisioning method for real-time virtual desktop service according to the embodiment of the present invention.

Referring to FIG. 19, in the virtual machine provisioning method for real-time virtual desktop service according to the embodiment of the present invention, first, the client unit transmits user information to the service gateway for access (S5010 and S5020).

The client unit may be a PC or a mobile device.

Figure 20:
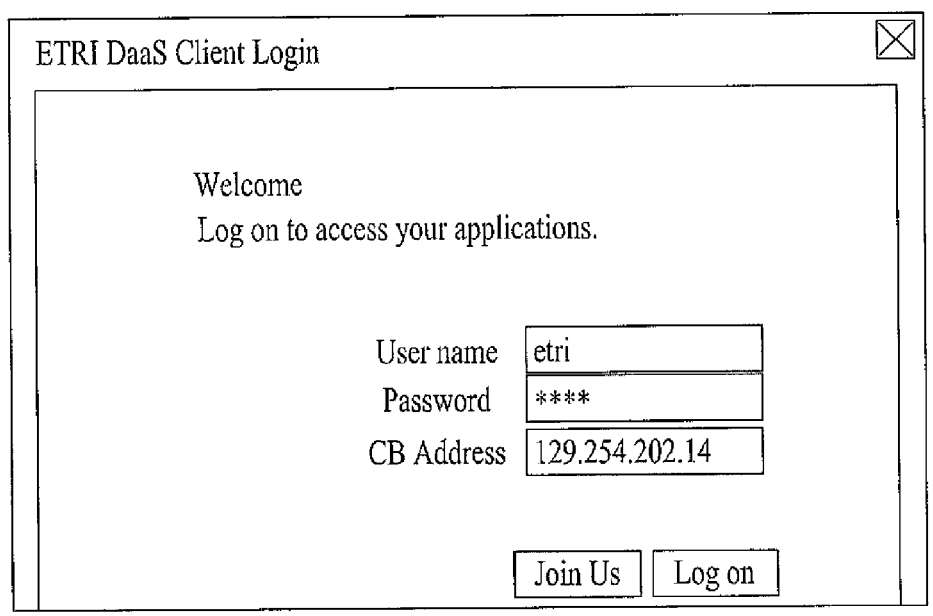
FIG. 20 is a view showing an interface of the virtual machine provisioning method for real-time virtual desktop service according to the embodiment of the present invention.

Steps S5010 and S5020 will be described in detail. Referring to FIG. 20, a user inputs user information corresponding to a user name and password and a CB address, which is an online address, of the service gateway on an access interface screen output to the PC or the mobile device.

The client unit attempts to access an online server corresponding to the CB address and, at the same time, transmits the user name and password to the online server.

Subsequently, the service gateway analyzes the user information to determine whether the user is a registered person (S5030).

When the user is classified as an unregistered person, the service gateway request the client unit to register a user ID, password, and virtual machine configuration information in order to generate a new user (S5040).

Step S5040 will be described in detail. Referring to FIG. 21, a name (NAME), identification (ID), password (PS), virtual machine configuration information (VM_USAGE), office name (Office-ID), telephone (Tel), and email address (E-mail) are input on a registration interface screen for user registration to generate a new user.

A process of configuring the virtual machine configuration information will hereinafter be described in detail with reference to FIGS. 22 and 23.

Subsequently, the service gateway determines whether there is any previously generated virtual machine corresponding to the user information (S5050).

In a case in which there is no previously generated virtual machine, the service gateway may request the client unit to register virtual machine configuration information to generate and register a new virtual machine (S5060).

The virtual machine configuration information may be configured in a preset mode or a manual mode.

Figure 22:
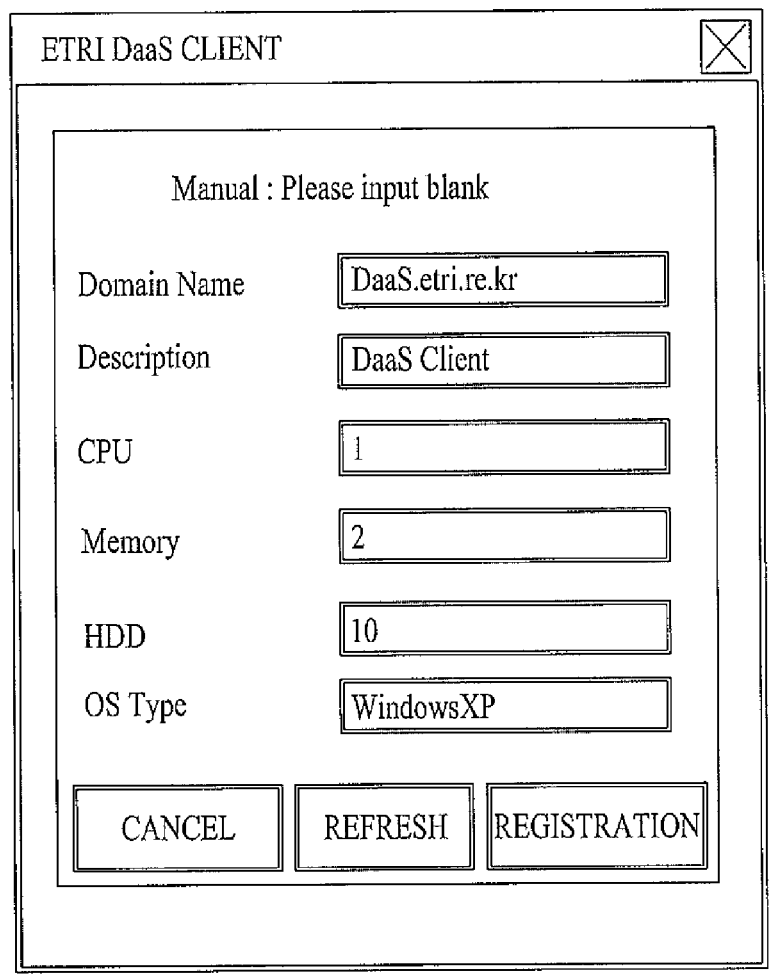
FIG. 22 is a view showing an interface of the virtual machine provisioning method for real-time virtual desktop service according to the embodiment of the present invention.

Referring to FIG. 22, in a case in which virtual machine configuration information is configured in the manual mode, a domain number (Domain Name), a description (Description), the number of CPUs, the number of memories, the hard disc capacity, and OS type information of a virtual machine to be provided are configured and registered.

Figure 23:
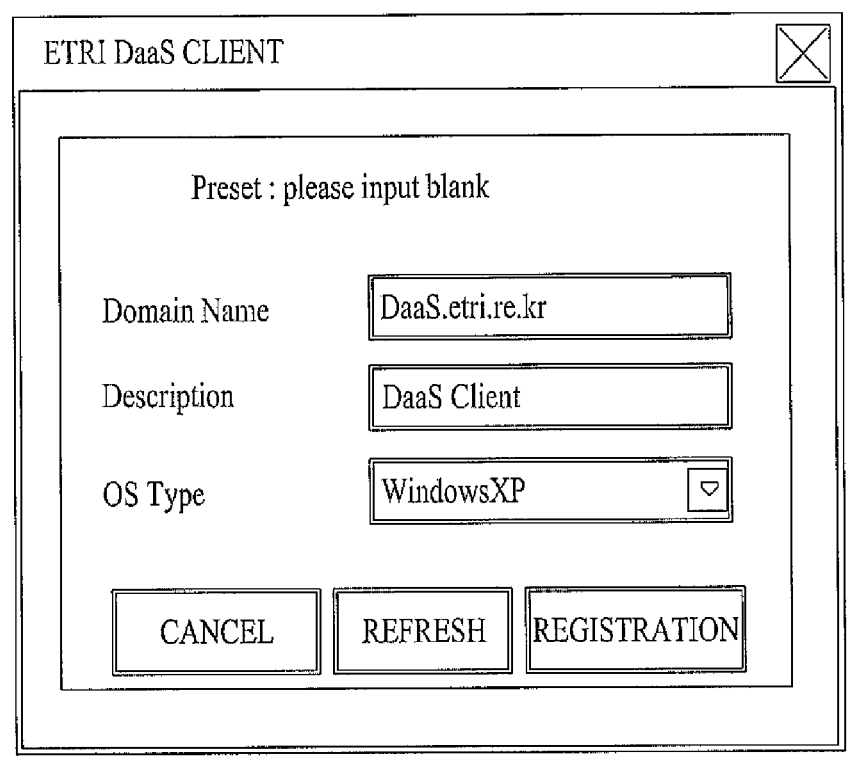
FIG. 23 is a view showing an interface of the virtual machine provisioning method for real-time virtual desktop service according to the embodiment of the present invention.

Referring to FIG. 23, in a case in which virtual machine configuration information is configured in the preset mode, the service gateway analyzes an authority level of the user information and decides a domain name and OS type of a virtual machine according to the authority level.

For example, the position and serviceable level of a user are analyzed through the office name input at step S5040 to configure the domain name and OS type.

The service gateway selects one from a plurality of service provider servers providing virtual machines and generates a virtual machine in the selected server based on the virtual machine configuration information configured in the preset mode or the manual mode.

As this time, preset virtual machine configuration information (template) is copied at a designated position and a previously formed file is renamed at a specific position.

Consequently, it is necessary for each service provider server to preset a template file proper to the server and have the template file at a fixed position. In addition, it is necessary for each service provider server to have a file suitable for the capacity of the server in default.

When generation of the virtual machine is completed as described above, the service provider server assigns access information to the client unit.

The access information may include an address and port number of the service provider server providing the virtual machine.

Subsequently, the client unit accesses the service provider server based on the assigned access information (S5070).

The service provider server renames a user OS file and user disc file corresponding to the virtual machine configuration information configured by the user and provides the remained user OS file and user disc file to the user without passing through a process of copying a previously prepared virtual machine file (S5080).

When assignment is completed, an assignment completion message is sent to the user and the user may perform booting based thereon.

Hereinafter, another embodiment for performing a service to provide a virtual machine to a user in real time will be described.

Figure 24:
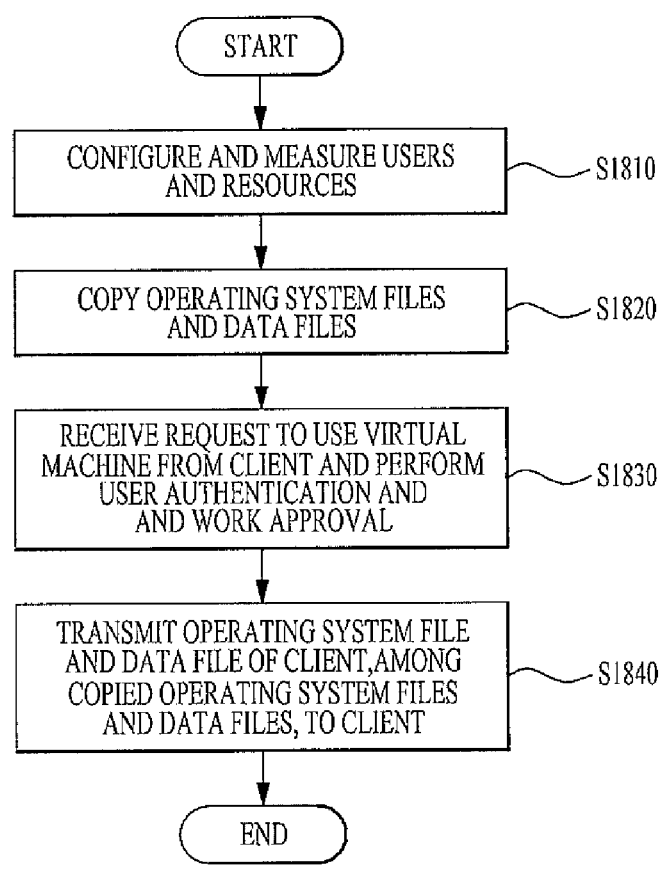
FIG. 24 is a flowchart showing a real-time virtual desktop service method according to another embodiment of the present invention.

FIG. 24 is a flowchart showing a real-time virtual desktop service method according to another embodiment of the present invention.

Referring to FIG. 24, the virtual desktop service apparatus configures and measures users and resources according to predetermined criteria (S1810). For example, the users may be configured based on a use method of the users, authority of the users, or a use frequency of the users.

The resource may be configured by measuring the maximum number ($Xvm\_limit$) of files that can be installed in a corresponding server, the maximum number ($Xpre\_max$) of files that can be maintained, the minimum number ($Xpre\_min$) of files that can be maintained, and available work capacity ($Pperf$) of the server.

The virtual desktop service apparatus copies operating system files and data files to be provided to the client (or user) before use request of the client (S1820). The virtual desktop service apparatus may copy the operating system files and the data files in the optimum state based on available resources of the server and a virtual machine that is being currently driven. The optimum file copying conditions will hereinafter be described.

The virtual desktop service apparatus receives the request to use the virtual machine from the client and perform user authentication and work approval (S1830). The virtual desktop service apparatus provides an operating system file and a data file of the client, among the copied operating system files and data files, to the client to transmit a virtual desktop environment (S1840).

It is possible for the virtual desktop service apparatus to perform a service to provide a virtual machine to a user in real time by pre-copying operating system files and data files, which have relatively large sizes as described above.

Figure 25:
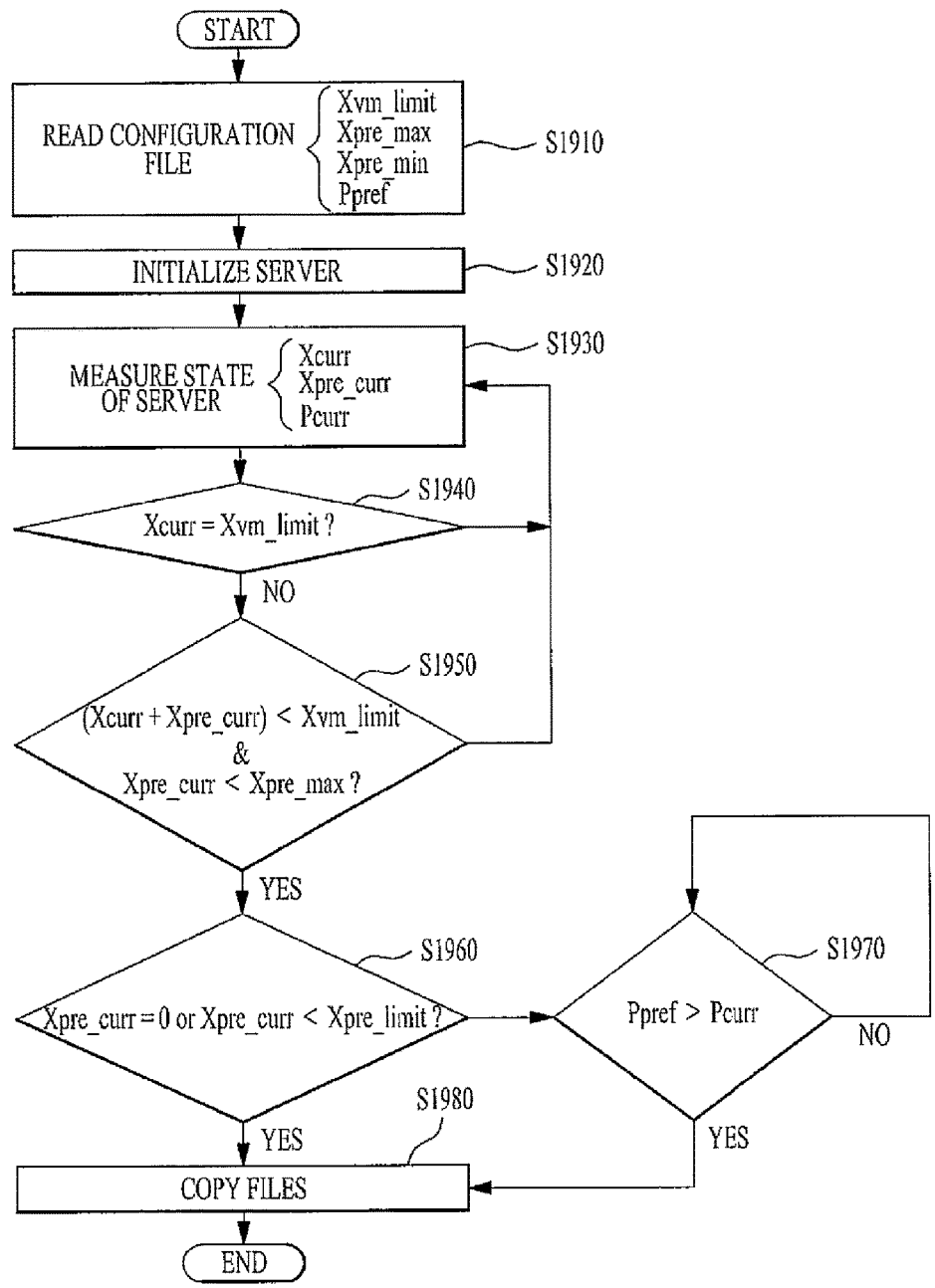
FIG. 25 is a view showing a virtual machine provisioning method for real-time virtual desktop service according to another embodiment of the present invention.

FIG. 25 is a view showing a virtual machine provisioning method for real-time virtual desktop service according to another embodiment of the present invention.

Referring to FIG. 25, the virtual desktop service apparatus may read an environment configuration file of the server (S1910). The environment configuration file of the server may include the maximum number ($Xvm\_limit$) of files that can be installed in the server, the maximum number ($Xpre\_max$) of files that can be maintained, the minimum number ($Xpre\_min$) of files that can be maintained, and available work capacity ($Ppref$) of the server. The above items may be measured and configured by the server or may be configured by user selection.

The virtual desktop service apparatus may perform a server initialization operation after reading the configuration file (S1920). The server initialization operation may be performed only once during initial driving of the server or may be selectively performed.

The virtual desktop service apparatus measures a state of the server (S1930). Server state measurement items may include the number ($Xcurr$) of current virtual machines, the number ($Xpre\_curr$) of previously prepared virtual machines, and a current work amount ($Pcurr$) of the server.

The virtual desktop service apparatus may compare the number ($Xcurr$) of current virtual machines with the maximum number (Xvm_limit) of files that can be installed (S1940). When the number (Xcurr) of current virtual machines is equal to the maximum number (Xvm_limit) of files that can be installed as the comparison result, the virtual desktop service apparatus may perform a state of the server again (S1930). When the number (Xcurr) of current virtual machines is not equal to the maximum number (Xvm_limit) of files that can be installed, the virtual desktop service apparatus may check the following conditions.

The virtual desktop service apparatus may check whether the sum of the number (Xcurr) of current virtual machines and the number (Xpre_curr) of previously prepared virtual machines is less than the maximum number (Xvm_limit) of files that can be installed and the number (Xpre_curr) of previously prepared virtual machines is less than the maximum number (Xpre_max) of files that can be maintained (S1950). Upon determining that the above conditions are not satisfied, the virtual desktop service apparatus may perform a state of the server again (S1930). Upon determining that the above conditions are satisfied, the virtual desktop service apparatus may copy operating system files and data files.

Alternatively, upon determining that the above conditions are satisfied, the virtual desktop service apparatus determines whether the number (Xpre_curr) of previously prepared virtual machines is 0 or is less than the minimum number (Xpre_min) of files that can be maintained (S1960). Upon determining that the above conditions are satisfied, the virtual desktop service apparatus may copy operating system files and data files (S1980).

When the number (Xpre_curr) of previously prepared virtual machines is equal to or greater than the minimum number (Xpre_min) of files that can be maintained, the virtual desktop service apparatus determines whether the current work amount (Pcurr) of the server is less than the available work capacity (Ppref) of the server (S1970). When the current work amount (Pcurr) of the server is less than the available work capacity (Pperf) of the server, the virtual desktop service apparatus copies files (S1980). When the current work amount (Pcurr) of the server is equal to or greater than the available work capacity (Pperf) of the server, the virtual desktop service apparatus measures the current work amount (Pcurr) of the server again and, when the current work amount (Pcurr) of the server becomes less than the available work capacity (Pperf) of the server, the virtual desktop service apparatus copies files (S1980).

Referring back to FIG. 1, the resource pool 120 provides software resources including operation system files, data files, and user profiles for virtual desktop service.

The file described in this specification means an image. The image means a kind of file or data for driving hardware or executing software. The image may include an operation system image and a disc image. The operation system image means a file for assisting to drive hardware and execute a processing program. The disc image means a file having contents in recording media. The disc image may include a data file. For example, the disc image may be decompressed using a compression program and then used. Alternatively, the disc image may be emulated as physical media using virtual software. In the present invention, the file means an image file or image data.

The virtual machine infrastructure 130 configures and measures users and resources and copies the operating system files and the data files to be provided to the client. The virtual machine infrastructure 130 measures and configures users and resources according to predetermined criteria before use request of the user. For example, the user may be configured based on a use method of the user, authority of the user, or a use frequency of the user.

In other words, the virtual desktop service apparatus may be a cloud service provider (CSP). The CSP manages and uses an offline image (or offline file) supplied to a client (cloud service user: CSU). The offline image is previously prepared after configuration and measurement of users and resources. The offline image is provided without lowering in performance of the apparatus and insufficiency in use when service is requested (for example, generation, copying, duplication, etc.)

The offline image means an environment image (or environment file), such as an operating system or an application. The environment image reflects a request of the client including an operation environment, an installed application, user data, and a service level and is ready to use and is then provided during execution of service.

In one embodiment, the resource may be configured by measuring the maximum number (Xvm_limit) of files that can be installed in a corresponding server, the maximum number (Xpre_max) of files that can be maintained, the minimum number (Xpre_min) of files that can be maintained, and available work capacity (Pperf) of the server. The maximum number (Xvm_limit) of files that can be installed means the maximum number of files that can be installed using all resources of the server. The maximum number (Xpre_max) of files that can be maintained means the number of files that can be optimally maintained excluding resources for another work. The minimum number (Xpre_min) of files that can be maintained means the number of files that can be maintained. The available work capacity (Pperf) of the server means a resource amount (for example, a degree of CPU occupation) or power size that can be assigned for the server to install a file and generate a virtual machine (VM). The above criteria may be measured and configured by the server or may be configured by user selection.

The virtual machine infrastructure 130 may check the maximum number (Xvm_limit) of files that can be installed, the maximum number (Xpre_max) of files that can be maintained, the minimum number (Xpre_min) of files that can be maintained, available work capacity (Pperf) of the server, and the position of files to configure and measure resources.

The virtual machine infrastructure 130 may perform a server initialization operation after reading the configuration file. The server initialization operation may be performed only once during initial driving of the server or may be selectively performed The virtual machine infrastructure 130 measures the number (Xcurr) of current virtual machines, the number (Xpre_curr) of previously prepared virtual machines, and a current work amount (Pcurr) of the server. The number (Xcurr) of current virtual machines means the number of virtual machines installed in the server at the time of measurement. The number (Xpre_curr) of previously prepared virtual machines means the number of virtual machines that are not currently being driven but are prepared so as to be driven at any time. The current work amount (Pcurr) of the server means a resource amount or power size that is being used by the server during driving of the virtual machine at the time of measurement.

When the number (Xcurr) of current virtual machines is equal to the maximum number (Xvm_limit) of files that can be installed, the virtual machine infrastructure 130 may wait until the number (Xcurr) of current virtual machines becomes less than the maximum number (Xvm_limit) of files that can be installed. When the number (Xcurr) of current virtual machines is less than the maximum number (Xvm_limit) of files that can be installed, the virtual machine infrastructure 130 may check another condition.

When the sum of the number (Xcurr) of current virtual machines and the number (Xpre_curr) of previously prepared virtual machines is less than the maximum number (Xvm_limit) of files that can be installed and the number (Xpre_curr) of previously prepared virtual machines is less than the maximum number (Xpre_max) of files that can be maintained, the virtual machine infrastructure 130 may copy system files and data files. Upon determining that the above conditions are not satisfied, the virtual machine infrastructure 130 may measure the number (Xcurr) of current virtual machines, the number (Xpre_curr) of previously prepared virtual machines, and the current work amount (Pcurr) of the server again.

Alternatively, the virtual machine infrastructure 130 may further check another condition and copy the operating system files and the data files when the condition is satisfied. When the number (Xpre_curr) of previously prepared virtual machines is 0 or is less than the minimum number (Xpre_min) of files that can be maintained, the virtual machine infrastructure 130 may copy the operating system files and the data files.

When the number (Xpre_curr) of previously prepared virtual machines is equal to or greater than the minimum number (Xpre_min) of files that can be maintained and the current work amount (Pcurr) of the server is less than the available work capacity (Pperf) of the server, the virtual machine infrastructure 130 may copy the operating system files and the data files.

When the current work amount (Pcurr) of the server is equal to or greater than the available work capacity (Pperf) of the server, the virtual machine infrastructure 130 may wait until the current work amount (Pcurr) of the server becomes less than the available work capacity (Pperf) of the server and then copy the operating system files and the data files.

The operating system files and the data files may be copied from a golden file. The golden file means a kind of original file previously generated by a user. The virtual machine infrastructure 130 may previously copy the operating system files and the data files from the golden file. The sizes of the operating system files and the data files are large and, therefore, it costs relatively much time to copy and serve the operating system files and the data files. For this reason, the virtual machine infrastructure 130 previously copies the operating system files and the data files for real-time virtual machine provisioning service. A small-sized template file may be copied upon receiving service request.

Subsequently, the connection broker 110 receives the request to use the virtual machine from the client and performs user authentication and work approval. The connection broker 110 outputs the use request to the virtual machine infrastructure 130.

The virtual machine infrastructure 130 provides an operating system file and a data file of the client, among the copied operating system files and data files, to the client according to the use request to transmit a virtual desktop environment.

The virtual desktop service apparatus may rapidly cope with service request of a user since the virtual desktop service apparatus previously prepares the operating system files and the data files as described above. Consequently, the virtual desktop service apparatus may monitor and control activity of the server in a state in which performance of the DaaS system is not affected.

The virtual desktop service apparatus and method according to the present invention are not limited to the constructions and methods of the exemplary embodiments set forth herein. The exemplary embodiments may be selectively combined in part or in whole to form various embodiments.

Meanwhile, the virtual desktop service method according to the present invention may be implemented as code that can be written on a processor-readable recording medium and thus read by a processor provided in the virtual desktop service apparatus. The processor-readable recording medium may be any type of recording device in which data is stored in a processor-readable manner. The processor-readable recording medium may include, for example, a read only memory (ROM), a random access memory (RAM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, according to various embodiments of the present invention as described above, the virtual desktop service apparatus and method provide a user operating system file and a disc file to be assigned to a user within a short time, thereby providing real-time virtual desktop service.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:
1. A virtual desktop service apparatus comprising:
a resource pool in a virtual desktop server that provides software resources comprising operation system files, data files, and user profiles for virtual desktop service;
a virtual machine infrastructure in the virtual desktop server that provides the software resources to a virtual machine according to a use request for the virtual desktop service; and
a connection broker in the virtual desktop server that receives the use request to use the virtual machine from any one of users, performs a user authentication, and provides a user terminal with preconfigured environmental files are provided without a loss of user functionality and a degradation of performance,
wherein the preconfigured environmental files including the operation system files are copied in advance in order to be allocated to the virtual machine,
wherein the connection broker requests information on a user profile, from among the user profiles, to assign the virtual machine,
wherein when the virtual machine does not include a software resource required by the use request, the connection broker requests the virtual machine infrastructure to assign or create a software resource according to a hardware configuration requested by the user terminal or a predefined hardware configuration, and after the software resource is assigned or created, the connection broker applies the user profile, wherein when the user terminal terminates the virtual machine, the user terminal executes a log out operation without loss of user data, and during the log out operation, the connection broker updates a modified user profile pool to keep the most recent information and releases the assigned or created software resource, wherein the connection broker performs a coordination of a delivery protocol used between the user terminal and the virtual desktop server that provide the virtual desktop service, wherein the virtual machine infrastructure supports high availability(HA) features with predefined configuration parameters, and based on the high availability features, multiple virtual machines are created from the same virtual machine template, wherein the delivery protocol is used to encapsulate and deliver access to an entire information system environment or the environment itself to the user terminal over a network, wherein a plurality of virtual machines in the virtual desktop server is generated over a single hypervisor, which abstracts and assigns physical hardware resources dynamically to the virtual machine, wherein the connection broker performs a load balancing function to allocate the virtual machine; and wherein display redirect is performed after a completion of the connection between the user terminal and the virtual desktop server that provide the virtual desktop service.

2. The virtual desktop service apparatus according to claim 1, wherein the virtual machine infrastructure checks the maximum number of files that can be installed, the maximum number of files that can be maintained, the minimum number of files that can be maintained, available work capacity of server, and position of the files to configure and measure the resources.

3. The virtual desktop service apparatus according to claim 2, wherein the virtual machine infrastructure checks the number of current virtual machines, the number of previously prepared virtual machines, and a current work amount of the server and, when the sum of the number of current virtual machines and the number of previously prepared virtual machines is less than the maximum number of files that can be installed and the number of previously prepared virtual machines is less than the maximum number of files that can be maintained, copies the operating system files and the data files.

4. The virtual desktop service apparatus according to claim 3, wherein, when the number of previously prepared virtual machines is 0 or is less than the minimum number of files that can be maintained, the virtual machine infrastructure copies the operating system files and the data files.

5. The virtual desktop service apparatus according to claim 4, wherein, when the number of previously prepared virtual machines is equal to or greater than the minimum number of files that can be maintained and the current work amount of the server is less than the available work capacity of the server, the virtual machine infrastructure copies the operating system files and the data files.

6. A virtual desktop service method comprising:

providing, at a resource pool in a virtual desktop server, software resources comprising operation system files, data files, and user profiles for virtual desktop service;

providing, at a virtual machine infrastructure in the virtual desktop server, the software resources to a virtual machine according to a use request for the virtual desktop service;

receiving, at a connection broker, the use request to use the virtual machine from any one of users; and, performing, at the connection broker, a user authentication, wherein the connection broker provides a user terminal with preconfigured environment files including an image of operating system (OS) and applications and installed user data, wherein the preconfigured environmental files are provided without a loss of user functionality and a degradation of performance, wherein the preconfigured environmental files including the operation system files are copied in advance in order to be allocated to the virtual machine, wherein the connection broker requests information on a user profile, from among the user profiles, to assign the virtual machine, wherein when the virtual machine does not include a software resource required by the use request, the connection broker requests the virtual machine infrastructure to assign or create a software resource according to a hardware configuration requested by the user terminal or a predefined hardware configuration, and after the software resource is assigned or created, the connection broker applies the user profile, wherein when the user terminal terminates the virtual machine, the user terminal executes a log out operation without loss of user data, and during the log out operation, the connection broker updates a modified user profile pool to keep the most recent information, and releases the assigned or created software resource, wherein the connection broker performs a coordination of a delivery protocol used between the user terminal and the virtual desktop server that provide the virtual desktop service, wherein the virtual machine infrastructure supports high availability(HA) features with predefined configuration parameters, and based on the high availability features, multiple virtual machines are created from the same virtual machine template, wherein the delivery protocol is used to encapsulate and deliver access to an entire information system environment or the environment itself to the user terminal over a network, wherein a plurality of virtual machines in the virtual desktop server is generated over a single hypervisor, which abstracts and assigns physical hardware resources dynamically to virtual machine, wherein the connection broker performs a load balancing function to allocate the virtual machine; and wherein display redirect is performed after a completion of the connection between the user terminal and the virtual desktop server that provide the virtual desktop service.

7. The virtual desktop service method according to claim 6, wherein the virtual machine infrastructure checks the maximum number of files that can be installed, the maximum number of files that can be maintained, the minimum number of files that can be maintained, available work capacity of the server, and position of the files to configure and measure the resources.

8. The virtual desktop service method according to claim 7, wherein the virtual machine infrastructure checks the number of current virtual machines, the number of previously prepared virtual machines, and a current work amount of the server and, when the sum of the number of current virtual machines and the number of previously prepared virtual machines is less than the maximum number of files that can be installed and the number of previously prepared virtual machines is less than the maximum number of files that can be maintained, copying the operating system files and the data files.

9. The virtual desktop service method according to claim 8, wherein when the number of previously prepared virtual machines is 0 or is less than the minimum number of files that can be maintained, the virtual machine infrastructure copies the operating system files and the data files.

10. The virtual desktop service method according to claim 9, wherein when the number of previously prepared virtual machines is equal to or greater than the minimum number of files that can be maintained and the current work amount of the server is less than the available work capacity of the server, the virtual machine infrastructure copies the operating system files and the data files.

* * * * *